US008030409B2

(12) United States Patent
Saldivar Guerra et al.

(10) Patent No.: US 8,030,409 B2
(45) Date of Patent: Oct. 4, 2011

(54) BLOCK COPOLYMERS CONTAINING FUNCTIONAL GROUPS

(75) Inventors: Enrique Saldivar Guerra, Saltillo (MX); Alfonso González Montiel, Atizapan de Zaragoza (MX)

(73) Assignee: CID Centro de Investigación y Desarrollo Tecnológico, S.A. de C.V., Lerma (MX)

( * ) Notice: Subject to any disclaimer, the term of this patent is extended or adjusted under 35 U.S.C. 154(b) by 630 days.

(21) Appl. No.: 11/977,487

(22) Filed: Oct. 25, 2007

(65) Prior Publication Data

US 2008/0108752 A1    May 8, 2008

Related U.S. Application Data

(62) Division of application No. 10/621,929, filed on Jul. 16, 2003, now Pat. No. 7,323,528.

(60) Provisional application No. 60/397,420, filed on Jul. 19, 2002.

(51) Int. Cl.
*C08L 25/14* (2006.01)
*C08L 25/08* (2006.01)

(52) U.S. Cl. ........ 525/241; 525/206; 525/222; 525/420; 525/437; 525/461; 525/534; 526/329.2; 526/347.1; 526/346

(58) Field of Classification Search .................... 525/88, 525/92 R, 92 B, 92 D, 92 E, 92 F, 93, 98, 525/99, 534, 468, 391, 392, 420, 241, 206
See application file for complete search history.

(56) References Cited

U.S. PATENT DOCUMENTS

| | | | |
|---|---|---|---|
| 3,953,404 A | 4/1976 | Borman | |
| 4,217,438 A | 8/1980 | Brunelle et al. | |
| 4,315,086 A | 2/1982 | Ueno et al. | |
| 4,328,327 A | 5/1982 | Tanaka et al. | |
| 4,581,429 A | 4/1986 | Solomon et al. | |
| 4,600,741 A | 7/1986 | Aycock et al. | |
| 4,605,731 A | 8/1986 | Evans et al. | |
| 4,644,053 A | 2/1987 | Brunelle et al. | |
| 4,732,937 A | 3/1988 | Sybert | |
| 4,748,203 A * | 5/1988 | van Abeelen et al. | 525/67 |
| 4,844,163 A | 7/1989 | Hazlett et al. | |
| 5,141,984 A | 8/1992 | Orikasa et al. | |
| 5,204,394 A | 4/1993 | Gosens et al. | |
| 5,231,146 A | 7/1993 | Brown et al. | |
| 5,274,034 A | 12/1993 | Morgan et al. | |
| 5,290,863 A | 3/1994 | Brown et al. | |
| 5,326,813 A | 7/1994 | Okada et al. | |
| 5,401,804 A | 3/1995 | Georges et al. | |
| 5,449,724 A | 9/1995 | Moffat et al. | |
| 5,910,549 A | 6/1999 | Matyjaszewski et al. | |
| 6,066,686 A | 5/2000 | Katayama et al. | |
| 6,069,206 A | 5/2000 | Nishihara et al. | |
| 6,143,848 A | 11/2000 | Lee et al. | |
| 6,239,226 B1 | 5/2001 | Fischer et al. | |
| 6,281,311 B1 | 8/2001 | Lai et al. | |
| 6,444,754 B1 | 9/2002 | Chin et al. | |
| 6,531,547 B1 * | 3/2003 | Visger et al. | 525/244 |
| 6,911,511 B1 | 6/2005 | Bertin | |
| 2005/0004310 A1 | 1/2005 | Hong et al. | |

FOREIGN PATENT DOCUMENTS

| | | |
|---|---|---|
| EP | 0 027 274 | 8/1984 |
| WO | WO 99/47575 | 9/1999 |

OTHER PUBLICATIONS

RD 332035 (Feb. 1991).*
Bell et al., The miscibility of copolymer blends involving the monomers itaconic anhydride, methyl methacrylate, styrene and acrylonitrile, Polymer, 1994, pp. 786-790, V. 35 No. 4, Butterworth-Heinemann Ltd.
Benoit et al., Development of a Universal Alkoxyamine for "Living" Free Radical Polymerizations, Journal of the American Chemical Society, 1999, pp. 3904-3920, V. 121 No. 16, American Chemical Society.
Benoit et al., One-Step Formation of Funcationalized Block Copolymers, Macromolecules, 2000, pp. 1505-1507, V. 33 No. 5, American Checmial Society.
Chiang et al., Polymer Blends of Polyamide-6 and Poly (phenylene oxide) Compatibilized by Styrene-co-Glycidyl Methacrylate, Journal of Applied Polymer Science, 1996, pp. 2411-2421, V. 61, John Wiley & Sons, Inc.
Gan et al., Phase Behavior of Blends of Styrene/Maleic Anhydride Copolymers, Journal of Applied Polymer Science, 1994, pp. 317-331, V. 54, John Wiley & Sons, Inc.
Harth et al., Chain End Funcationalization in Nitroxide-Mediated "Living" Free Radical Polymerizations, Macromolecules, 2001, pp. 3856-3862, V. 34 No. 12, American Chemical Society.
Koulouri et al., Terminal Anhydride Functionalized Polystyrene by Atom Transfer Radical Polymerization Used for hte Compatibilization of Nylon 6/PS Blends, Macromolecules, 1999, pp. 6242-6248, V. 32 No. 19, American Chemical Society.
Merfeld et al., Binary interaction parameters from blends of SMA copolymers with TMPC-PC copolycarbonates, Polymer, 1998, pp. 1999-2009, V. 39 No. 10, Elsevier Science Ltd., Great Britian.
Park et al., Terminal Anhydride Functionalization of Polystyrene, Journal of Polymer Science, Polymer Chemistry, 1991, pp. 1329-1338, V. 29, John Wiley & Sons, Inc.

(Continued)

*Primary Examiner* — Rip A. Lee
(74) *Attorney, Agent, or Firm* — Stephen S. Hodgson

(57) ABSTRACT

The present invention provides a block copolymer of styrene and an unsaturated cyclic anhydride, such as maleic anhydride, a process for making a copolymer using controlled free radical polymerization in which certain parameters are adjusted to control the microstructure and molecular weight of the copolymer, and a method for using the block copolymer, including as a compatibilizer. Microstructure and molecular weight in the block copolymer can be controlled by adjusting the ratio of stable free radical to initiator. The copolymer can be made in a one step process and has a controlled microstructure that allows one block to be reactive toward several chemical moieties available in engineering polymers and the other block to be fully miscible with polystyrene or polymers miscible with polystyrene or polymers miscible with polystyrene such as polyphenylene ether.

11 Claims, 3 Drawing Sheets

OTHER PUBLICATIONS

Park et al., Living Radical Copolymerization of Styrene/Maleic Anhydride, Journal of Polymer Science Part A-Polymer Chemistry, 2000, pp. 2239-2244, V. 38, John Wiley & Sons, Inc.

Yao et al., Continuous Thermal Bulk Copolymerization of Styrene and Maleic Anhydride, Journal of Applied Polymer Science, 1999, pp. 615-622, V. 73, John Wiley & Sons, Inc.

Moad et al., The Chemistry of Free Radical Polymerization, 1995, pp. 277-283, Pergamon.

1 page Patent Abstract of Japanese Patent No. 57-074313 published May 10, 1982.

Cuatepotzo et al., New Controllers for Nitroxide mediated polymerization. A study of electronic effects and of the [nitroxide]/[initiator] ratio on the polymerization control, Submitted for publication to Journal of Polymer Science, 2003 (pending), pp. 1-23.

Saldivar and Gonzalez et al., Synthesis of Novel Copolymers Via Controlled Radical Polymerization (CRP), Slides from Presentation at Second Conference for the Commercialization of Controlled POlymer Synthesis, Dec. 4-5, 2000, 29 pgs., The Knowledge Foundation. Cambridge, USA.

\* cited by examiner

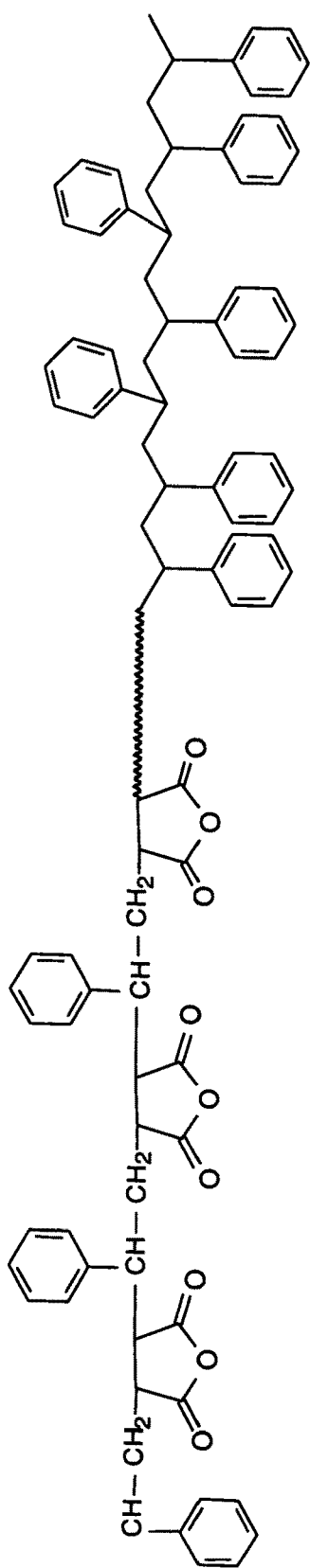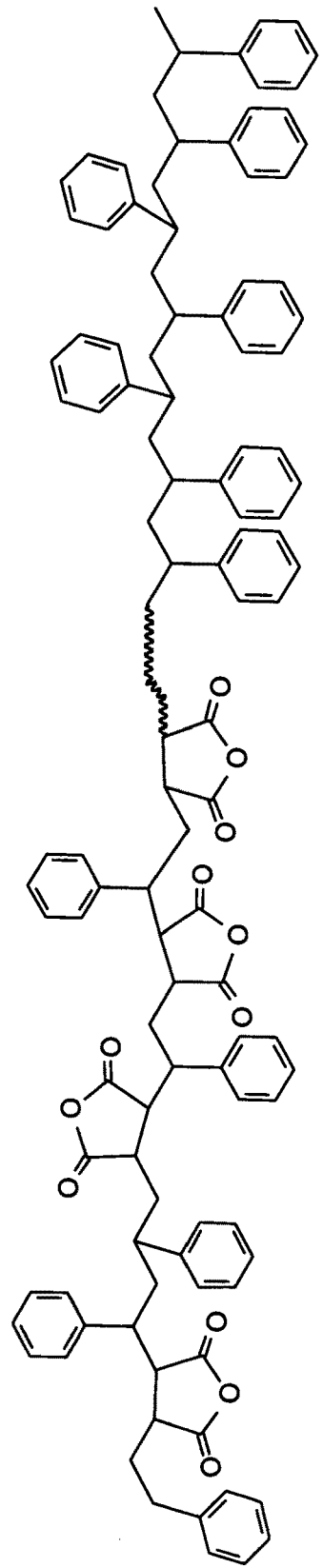
FIG. 1A
FIG. 1B

BLOCK COPOLYMERS CONTAINING FUNCTIONAL GROUPS

CROSS REFERENCE TO RELATED APPLICATION

This is a divisional of and priority is claimed to U.S. patent application Ser. No. 10/621,929, filed Jul. 16, 2003, now U.S. Pat. No. 7,323,528, issued Jan. 29, 2008, which is hereby incorporated by reference and which claims priority to U.S. Provisional Patent Application Ser. No. 60/397,420, filed on Jul. 19, 2002, which is hereby incorporated by reference.

BACKGROUND OF THE INVENTION

1. Field of the Invention

The present invention pertains to a synthesis of and a process for making block copolymers of styrene and an unsaturated cyclic anhydride, such as maleic anhydride or itaconic anhydride, via free radical polymerization, in the presence of a stable free radical, a composition of matter comprising block copolymers of styrene and an unsaturated cyclic anhydride, and use of the composition of matter as a compatibilizer in blending polymers.

2. Description of the Related Art

Random copolymers of styrene and an unsaturated cyclic anhydride (UCA), in particular maleic anhydride (MA), with different compositions, have been produced by a number of free radical polymerization processes. One of the end-uses of these materials is the compatibilization of blends of styrenic polymers with other thermoplastics. The content of maleic anhydride in the copolymer, and the copolymer molecular weight, play an important role in the ability of these materials to act as effective compatibilizers. Compatibilizer materials that present a block copolymer structure, in which each one of the blocks is thermodynamically compatible with one of two polymeric materials to be blended, perform more effectively as compatibilizers than their random copolymer counterparts. This permits the use of a smaller amount of compatibilizer material to obtain the desired end-properties in the polymer blend and in some cases may be the only way to achieve the compatibilization of the two otherwise incompatible polymers.

Traditional free radical processes cannot produce block copolymers due to the fact that each individual polymer chain formed has an extremely short life-time (time that it remains as a polymeric free radical). During this short active life it is practically impossible to change the environment surrounding the active chain, so it is not feasible to change the monomer to a second one which would result in a block copolymer. Living polymerization processes, in which termination reactions are suppressed or significantly reduced, allow for the formation of block copolymers, as the life of each individual chain is extended to periods comparable to the duration of the process (minutes or hours). It is possible to produce block copolymers by anionic polymerization, but this technique presents severe limitations for its broad practical application. On one hand, it requires conditions of extreme purity in the monomers because humidity traces destroy the catalyst, and for many monomers it is very difficult to control, requiring extremely low temperatures. Also, the polymerization of monomers having functional groups is not practical since the catalyst can be destroyed by the presence of a number of functional groups. As a result, the industrial application of this technique is reduced to a few monomers, leaving out technologically important functional monomers.

Due to limitations in the anionic polymerization process a more promising technique for producing block copolymers with a large variety of monomers is that based on living or quasi-living free radical polymerization. This can be achieved by adding to an otherwise standard free radical polymerization recipe, a chemical agent that significantly reduces the extent of irreversible termination or chain transfer reactions, conferring a living or quasi-living character to the polymerization, which is also called "controlled polymerization" or "controlled free radical polymerization." There are several ways to obtain this behavior, but most of them are limited in an industrial practice because they require chemical agents that are not readily commercially available in the market. Among these techniques, one that is particularly useful, and for which the required chemical agents are available in the market, is a quasi-living free radical polymerization controlled by 2,2,6,6 tetramethyl-piperidine-N-oxyl, which is known as TEMPO, and derivatives thereof, which act as stable free radicals capping polymeric growing radicals and uncapping them in a fast and reversible way, allowing for short periods of propagation through monomer-addition steps. U.S. Pat. No. 5,401,804, issued to Georges et al., which is incorporated by reference, describes a polymerization process for producing low polydispersity polymers and block copolymers via a free radical polymerization process that uses a free radical initiator and TEMPO derivatives. However, in order to produce block copolymers, Georges et al. require a sequential addition of monomers, in some cases exhausting the first monomer before adding the second one, resulting in a process with several reaction steps and long overall reaction times.

U.S. Pat. No. 6,531,547 B1, issued to Visger and Lange, discloses a polymerization procedure in the presence of a stable free radical, for the preparation of a block copolymer formed of a vinyl aromatic monomer (which can be styrene) in the first block and a copolymer of a vinyl aromatic monomer and an acrylic monomer (which can be maleic anhydride) in the second block, to be used as an additive for lubricating oil compositions. However, it is believed the process requires the sequential addition of the monomers.

International Patent Publication No. WO 99/47575, issued to Vertommen et al., describes a process for the copolymerization of a vinyl monomer and a maleic monomer in the presence of an initer (e.g. alkoxyamine) for the production of low molecular weight block copolymers. Only the production of low molecular weight polymer is believed to be disclosed in this patent. Additionally, this process requires an alkoxyamine that is not believed to be readily available at the industrial level.

In an improvement on previous techniques, a procedure described in "One-Step Formation of Functionalized Block Copolymers," Macromolecules, Vol. 33, 1505-1507 (2000) is proposed by Benoit et al. to produce block copolymers containing functional groups via a one-step, quasi-living free radical polymerization mediated by nitroxide compounds. However, in an application to styrene-maleic anhydride copolymers, Benoit et al. were not able to obtain living behavior by only adding a single stable free radical to the standard free radical polymerization recipe. Instead, they had to use a combination of an ?-hydrido-based alkoxyamine and a nitroxide-type stable free radical in order to achieve livingness. This approach is difficult to scale-up in an economic way to an industrial process due to the complexity in synthesizing the alkoxyamine, as described in Benoit et al., Journal of the American Chemical Society, 121, 3904 (1999), as this synthesis involves several reaction steps.

In another attempt of producing block copolymers with functional groups, Park et al., in "Living Radical Copolymerization of Styrene/Maleic Anhydride," J. Polym. Sci., Part A: Polym. Chem., 38, 2239 (2000), report on the synthesis of diblock copolymers containing a block of styrene-co-maleic anhydride and another block rich in styrene, starting from a mixture of TEMPO, benzoyl peroxide as initiator, and the two monomers. They report some degree of living character in their polymerizations, but they only get polymers having number average molecular weight (Mn) up to 23,500 after 20 hrs. of reaction, which is a chain length generally too low to act as a compatibilizer and also limits its use for other potential applications.

Other attempts tested the chain-end functionalization of polystyrene; that is, the synthesis of styrene polymers having only one functional monomer unit at the end. The general idea of this approach is to use a living or quasi living process of styrene polymerization, which is terminated by adding an excess of a second functional monomer that does not homopolymerize. Harth et al., in "Chain End Functionalization in Nitroxide-Mediated Living Free Radical Polymerization," Macromolecules, 34, 3856 (2001), report on the synthesis of such materials via quasi-living radical polymerization procedures mediated by alkoxyamines; however, these last compounds are not readily available in the market and their preparation requires several reaction steps. Also, Koulouri et al., in "Terminal Anhydride Functionalized Polystyrene by Atom Transfer Radical Polymerization Used for the Compatibilization of Nylon 6/PS Blends," employ a similar approach, but using atom transfer radical polymerization (ATRP) to impart living character to the polymerization. This technique, however, suffers from several drawbacks since ATRP requires a metal based catalyst-ligand system, which results in a number of practical problems including metal removal, catalyst removal and/or reuse and color in the polymer. A related way of synthesizing chain end-maleic anhydride functionalized polystyrenes, is to add trimellitic anhydride chloride in order to terminate living chains of polystyrene growing via anionic polymerization, as disclosed by I. Park et al., J. Polym. Sci., Polym. Chem. Ed., 29, 1329 (1991). This creates a single functional group at one end of a polymeric chain. However, this approach suffers from the deficiencies mentioned before and common to all anionic polymerization processes, and it cannot add more than one maleic anhydride unit, limiting the compatibilization versatility of the materials produced.

Yet another attempt of obtaining chain-end functionalized polystyrene is described in U.S. Pat. No. 6,143,848 issued to Lee et al. They perform a controlled radical polymerization via degenerative transfer, using a functionalized iodine reagent. However, a drawback of degenerative transfer is that there is always a low molecular weight radical available for termination, which leads to poor control of the polymerization.

It is well established that the reactivity ratios of styrene and maleic anhydride are nearly zero at temperatures below 80.degree. C., and this results in almost perfectly alternating copolymers. The kinetic data in the literature above 80.degree. C. are scarce, but there seems to be some tendency towards alternation at these higher temperatures. See Zhen Yao et al., Continuous Thermal Bulk Copolymerization of Styrene and Maleic Anhydride, Journal of Applied Polymer Science, 73, 615-622 (1999). The tendency towards alternation of the free radical copolymerization of styrene and itaconic anhydride is less pronounced than in the case of the copolymerization of styrene with maleic anhydride, but it is also present.

With respect to the commercial production of copolymers of styrene and maleic anhydride, special bulk and heterogeneous processes have been developed for the production of random and alternating copolymers. Molar compositions containing less than 10% of maleic anhydride require controlled addition of low amounts of maleic anhydride. Bulk continuous processes oriented to this goal have been described in European Patent No. 27,274, issued Aug. 5, 1984, to Daicel Chemical Industries KK and in Japanese Patent No. 74,313, issued May 10, 1982, to Mitsubishi Monsanto Co., but they result in essentially random copolymers.

Random copolymers of styrene-maleic anhydride (rSMA) have been used as compatibilizers in polymer blends. In a random copolymer the maleic anhydride groups are randomly distributed along the chain of the copolymer. Consequently, the structure of such a compatibilizer cannot be controlled. The key to achieve the desired performance has been the reaction of the maleic anhydride units of the copolymer with a functional group or moiety of one of the polymers included in the blend as well as the miscibility or compatibility of the rSMA with the other components of the blend. However, this in turn has proven to be a shortcoming for the applicability of these copolymers because the miscibility window of rSMA with other polymers is usually narrow, and it is restricted to composition and molecular weight ranges of the copolymer. It is well documented that random copolymers with a maleic anhydride content higher than 8% are not miscible with polystyrene (see Merfeld et. al., Polymer, 39, 1999 (1998), and that its miscibility window with other styrenic copolymers (SMMA, rSMA, SAN) is also restricted (see Gan et. al., J. Appl. Polym. Sci., 54, 317 (1994)). The miscibility of styrene-itaconic anhydride random copolymers shows a similar trend (see Bell et. al., Polymer, 35, 786 (1994)). This limits the applications of rSMA as a compatibilizer for several systems, although it has been sought to compatibilize blends with engineering polymers that contain reactive groups toward the carboxylic functionality of the MA.

Engineering thermoplastics such as polyamides, polyphenylene ethers, polycarbonates and polyesters have excellent physical properties such as strength and stiffness, but it is often required to blend or alloy these with other thermoplastics in order to improve their impact toughness or to reduce their overall cost. However, the components of such blends are usually highly incompatible. It is thus common practice to include a compatibilizer that functions to improve the adhesion between the incompatible components and/or to modify the surface tension at the phase boundaries.

Of particular interest are blends of polyphenylene ethers and polyamides. Such blends are inherently incompatible. Molded articles made from these blends, without a compatibilizing agent, have inferior mechanical properties, such as low impact strength. Numerous attempts to compatibilize this system have been reported, U.S. Pat. No. 4,315,086 describes grafting PPE directly to the polyamide; U.S. Pat. Nos. 4,600,741 and 4,732,937 depict the formation of copolymers of polyphenylene ether and polyamide using an epoxy functionalized polyphenylene ether. U.S. Pat. Nos. 5,231,146 and 5,141,984, and also Chiang et al., in the J. of Appl. Polym. Sc., 61(3), 1996, 2411-2421, portray the use of polyepoxides and compounds containing glycidyl groups to achieve compatibility of the blends. U.S. Pat. No. 6,444,754 discloses the use of an epoxy functionalized oligomer prepared by free radical polymerization of an ethylenically unsaturated monomer or oligomer in the presence of a glycidyl-functionalized nitroxyl initiator.

Other commercially important systems include blends of polycarbonate and polyesters with styrene copolymers, in particular with high impact polystyrene. Efforts to compabilize these systems have also been reported. U.S. Pat. No. 4,748,203 discloses a polymer mixture of aromatic polycarbonate and rubber modified polystyrene. The agent to improve bonding is a polymer or copolymer of a vinyl aromatic with free carboxyl groups obtained by polymerization in the presence of an unsaturated carboxylic monomer (eg. maleic anhydride, acrylic/methacrylic acid or acrylate esters). U.S. Pat. No. 5,274,034 describes polymeric compositions comprising an aromatic polycarbonate, an aromatic polycarbonate containing acid or ester functionality, a styrene based polymer and a styrene polymer bearing oxazoline groups. As being useful in molding objects with matt surfaces. U.S. Pat. No. 5,204,394 illustrates mixtures comprising an aromatic polycarbonate, a copolymer containing styrene and a polymer grafted with polystyrene. U.S. Pat. No. 6,066,686 describes the use of epoxidized SBS copolymer as the compatibilizer and optionally polyesters such as PET, PBT or polyphenylene ether. U.S. Pat. No. 6,069,206 describes the use of a styrene-acrylonitrile copolymer with low acrylonitrile content and with a particular range of solubility parameter as a compatibilizer.

Compatibilizers for the blends of interest described in the prior art are based on copolymers where it is not possible to control microstructure (functionalized polymers are usually a random copolymer or melt functionalized polymer). The miscibility of such copolymers is compromised by its composition, limiting its application as a compatibilizer as in the case of random copolymers of styrene and maleic anhydride (Gan et. al., J. Appl. Polym. Sci., 54,317 (1994)).

SUMMARY OF THE INVENTION

In the present invention a compatibilizer for the above mentioned blends and others is a block copolymer based on styrene and an unsaturated cyclic anhydride (UCA). This copolymer is produced in a one-chemical step polymerization process and has a controlled microstructure that allows one block to be reactive toward several chemical moieties available in engineering polymers and the other block to be fully miscible with polystyrene or polymers miscible with polystyrene such as polyphenylene ether. The copolymers of the present invention provide a straight forward path to obtain compatibilizers for polymer blends where both reactivity and miscibility can be controlled separately. In one embodiment, control of microstructure and molecular weight in the block copolymer is maintained by adjusting the ratio of initiator to monomer and/or by adjusting the ratio of stable free radical to initiator.

The present invention provides an efficient process by which it is possible to create polymers rich in styrene that possess a few maleic anhydride or itaconic anhydride units located near one end of the chain, resulting in better compatibilizer compounds, that can be obtained in existing polymerization facilities with minimal changes and using raw materials that are readily available in commercial markets.

The present invention provides a process and a block copolymer therefrom, based on styrene and an unsaturated cyclic anhydride (UCA), such as maleic or itaconic anhydride, in which the composition, microstructure and molecular weight of the copolymer is carefully controlled. A first embodiment of the present invention is a block copolymer comprising a first block comprising a random copolymer of styrene and UCA having a total length between about 1 and about 720 monomeric units, a second block comprising polystyrene having between about 100 and about 2000 monomeric units, wherein the polydispersity can be relatively narrow.

The first block of random copolymer of styrene and UCA preferably has some degree of alternating character given by the reactivity ratios of the monomers. The polydispersity is preferably between about 1.2 and about 3.0. These copolymers are better compatibilizers for blends of styrenic polymers and some polar polymers than random copolymers of the same global composition.

The present invention further provides a one chemical step process using a stable free radical, a traditional free radical initiator, optionally a solvent, styrene and maleic or itaconic anhydride; these last components in the proportions established in the first embodiment of this invention, all preferably added simultaneously in a reactor and heated for several hours to produce the block copolymer mentioned in the first embodiment of this invention.

The present invention also provides a one chemical step batch process similar to the one described in the immediately previous paragraph, but performed in two process stages as follows:
  a) in a first stage all the reactants are charged in a first reactor with agitation and heated up to conversions of about 10 to about 50%; and
  b) in a second stage the reaction continues by heating in the same or in a different reactor vessel or vessels without agitation up to conversions of about 90 to about 100%.

The present invention further provides a bulk or solution continuous process, which is chemically similar to the one just described, including three sequential process steps: An optional step for heating and passing the reaction mixture through a tubular type reactor in which the exit fractional monomer conversion is numerically about twice or larger than the mass fraction of UCA in the feed (with respect to total monomer) to form a first intermediate; and a reacting of the first intermediate in a continuous stirred tank reactor with exit conversions between about 10 and about 50% by weight to form a second intermediate; and passing the second intermediate through a tubular type reactor in which the final conversion is between about 60 and about 100% by weight.

The present invention provides a method of using a block copolymer of styrene and an unsaturated cyclic anhydride (UCA), which has been made according to the present invention, as a compatibilizer for thermoplastic blends including polystyrene or a polymer miscible or compatible with polystyrene and an engineering thermoplastic with functional groups or moieties capable of reacting with the dicarboxylic moiety of the UCA units.

The fact that the location of the UCA units is controlled as part of an initial block of the copolymer provides an advantage over a random copolymers of styrene and maleic anhydride. When melt processing a polymer blend containing a block copolymer according to the present invention, the dicarboxylic moieties of the UCA react with functional groups of several engineering thermoplastic polymers, yielding a graft copolymer that works as a compatibilizer for an otherwise incompatible blend. In the styrene-UCA block copolymer of the present invention, the location and average number of UCA units per chain can be precisely controlled, and thus, the structure of the graft copolymer formed in-situ during melt compounding with functionalized thermoplastics can also be controlled. This control allows the newly formed graft copolymer to be a better compatibilizer because there is a large portion of the chain that remains essentially a pure polystyrene block that is miscible and compatible with other polymers. Examples of polymers miscible or compatible with the polystyrene block are polyphenylene ether, tetra methyl polycarbonate, high impact polystyrene (polystyrene modified with rubber), and styrene block and random copolymers. The thermoplastics with functional groups capable of reacting with maleic anhydride include, but are not limited to, polyamides, polycarbonate, poly(ethylene terephtalate), and poly(butylene terephtalate).

Additionally the present invention provides a method for using a block styrene-UCA copolymer as a coupling agent for polystyrene and copolymers of styrene and various fillers including polystyrene or a polymer miscible or compatible with polystyrene and a filler with chemical affinity and/or functional moieties capable of reacting with the dicarboxylic moiety of the UCA units.

BRIEF DESCRIPTION OF THE DRAWINGS

FIG. 1A is a schematic representation of a block copolymer of styrene and maleic anhydride forming poly((styrene-alt-maleic anhydride)-b-styrene) according to the present invention.

FIG. 1B is a schematic representation of a block copolymer of styrene and maleic anhydride forming poly((styrene-r-maleic anhydride)-b-styrene) according to the present invention.

DETAILED DESCRIPTION OF THE INVENTION

Figure 2:
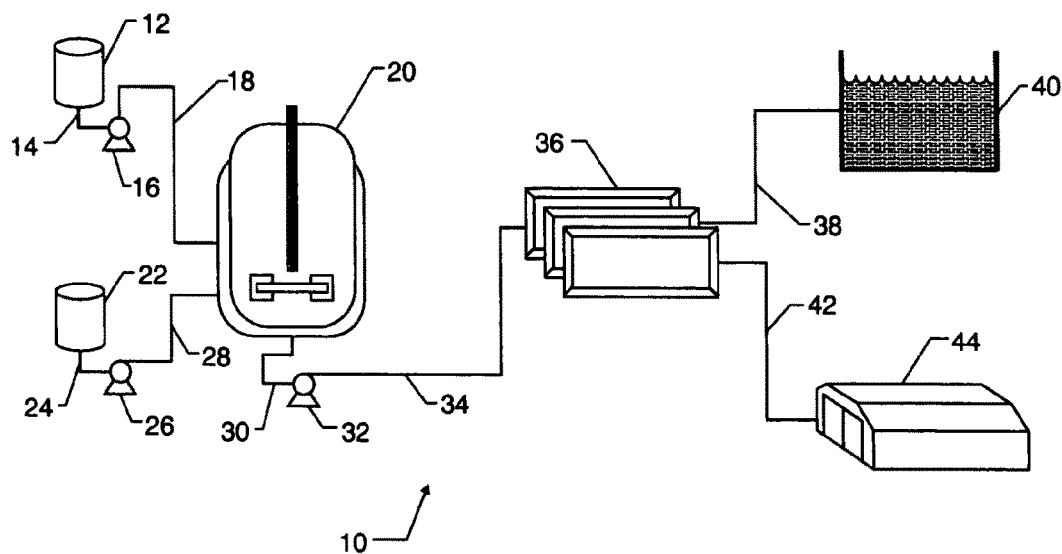
FIG. 2 is a schematic representation of a batch process for making block copolymer according to the present invention.

The present invention provides a process and a block copolymer therefrom, based on styrene and an unsaturated cyclic anhydride (UCA), such as maleic or itaconic anhydride, in which the composition, microstructure and molecular weight of the copolymer are carefully controlled. The term microstructure refers to a detailed sequence or arrangement of units of each of the monomers in an average or typical copolymer chain. The term composition refers to the overall average relative amount of monomer 1 and monomer 2 in copolymer chains, and can be expressed in a molar or weight basis. In particular, one embodiment of the invention comprises block copolymers having a first block of a random copolymer of styrene and an unsaturated cyclic anhydride (UCA), such as maleic or itaconic anhydride, with some degree of alternating character given by the reactivity ratios of the monomers, and a total length between 1 and 720 monomeric units and a second block of essentially pure polystyrene with a length between 100 and 2000 monomeric units, wherein the polydispersity is relatively narrow, preferably between 1.2 and 3.0.

FIG. 1A is a schematic representation of a block copolymer of styrene and maleic anhydride forming poly((styrene-alt-maleic anhydride)-b-styrene) according to the present invention. FIG. 1B is a schematic representation of a block copolymer of styrene and maleic anhydride forming poly((styrene-r-maleic anhydride)-b-styrene) according to the present invention.

The term "random copolymer" is well known in the art and refers to a copolymer in which the monomer units of different chemical nature are located in a random sequence along the polymeric chain. On the other hand, the term "block copolymer" is also well known in the art and refers to a copolymer in which there are at least two segments of the chain having each one of them a distinct and given composition. Usually one segment, or block, is made of units of identical chemical nature and another segment, or block, is made of units of identical chemical nature too, but different from that of the first block. Other variations of block copolymers include segments formed by units having more than one chemical identity, and their sequence in the segment can be arranged in virtually any specific way, well known in the art, such as random or alternating, for example. The feature that characterizes a block copolymer is that it has at least two segments of distinct and well defined chemical composition and/or microstructure.

The term "polydispersity" is also well known in the art as the ratio of weight average to number average molecular weight of the copolymer. Polymers are not materials formed by molecules with a unique and well established molecular weight, but rather by molecules of different lengths, giving rise to a molecular weight distribution. This distribution is characterized by number and weight averages, and its broadness is characterized by the polydispersity. The greater the polydispersity is, the broader the molecular weight distribution is. Traditional free radical polymerization processes provide polymers with relatively broad molecular weight distributions, ranging from 1.5 to 3.5 or higher, depending on the specific polymer and polymerization process used for the synthesis.

It is not believed possible to obtain polymers with polydispersities lower than 1.5 via traditional free radical polymerization. Polymers provided by this invention on the other hand, which are produced via quasi-living or controlled free radical polymerization, have polydispersities starting at values well below 1.5 and thus have relatively narrow molecular weight distributions. Consequently different individual chains in a polymer sample tend to possess similar total lengths, composition and microstructure, rendering a more homogeneous polymer that performs in a more uniform way when used as compatibilizer or coupling agent.

Chemical Synthesis of Block Copolymers

A block copolymer can be made according to the present invention using a one chemical step (or single step) process for polymerizing the copolymer using a stable free radical and a traditional free radical initiator. A preferred stable free radical contains the group .O—N< and is selected from the family of nitroxy radical compounds. Typical examples of nitroxy radical compounds include, but are not limited to,

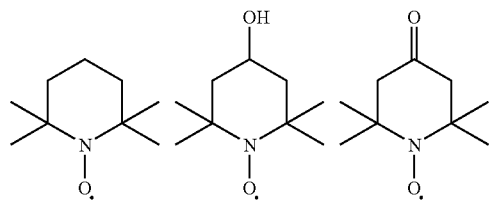

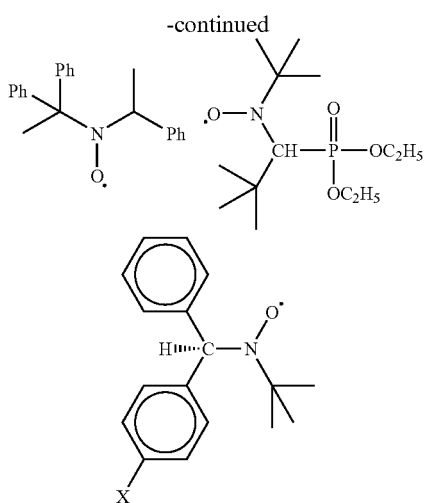

where X is H, Cl or MeO.

The last family of compounds (3,3-dimethyl-1,1-diphenyl azabutane-N-oxides) are not commercially available, but a procedure for their synthesis can be found in an article entitled "New controllers for nitroxide mediated polymerization. A study of electronic effects and of the [nitroxide]/[initiator] ratio on the polymerization control" by R. Cuatepotzo, M. Albores-Velasco and E. Saldivar, submitted for publication to Journal of Polymer Science (2003), which is incorporated by reference. Other compounds in the family may be taken out of the nitroxy radicals derivated from those mentioned in the U.S. Pat. No. 4,521,429, issued to Solomon et al., which is incorporated by reference.

TEMPO derivatives such as 4-oxo-TEMPO and 4-hydroxy-TEMPO have long been used for inhibiting polymerization of monomers in distillation columns. Since they are commercially available at reasonable prices from a number of sources, they are primary candidates to be used as stable free radicals in the process of the present invention. However, care must be exerted not to use grades of these materials that have high level of impurities, which may cause low reproducibility in the polymerization of the present invention.

Preferred free radical initiators include peroxide and azo compounds. Typical examples include, but are not limited to, 2,2'-Azobis (2-Methylpropanenitrile), 2,2'-Azobis (2-Methylbutanenitrile), dibenzoyl peroxide (BPO), Tert-Amyl peroxy-2-ethylhexanoate, Ter-Butyl peroxy-2-ethylhexanoate, 2,5-Bis(2-ethylhexanoylperoxy)-2,5-dimethylhexane and ter-Butyl peroxydiethylacetate.

The synthesis conditions of the polymerization reaction for obtaining the copolymers of the present invention are described next. Bulk or solution processes can be employed. For the solution process, any solvent that forms a solution with styrene, UCA, initiator and stable free radical can be used. Typical solvents include aromatic or substituted aromatic hydrocarbons, as well as aliphatic and substituted aliphatic hydrocarbons. If used, the preferred solvents are substituted aromatics, more preferably toluene, xylene or ethyl benzene or polar solvents like acetone, chloroform or ethyl acetate. When used, the solvent is preferably present in amounts of about 5 to about 95% by weight on the basis of the mixture of monomers and solvent.

During extensive experimentation, it was discovered that the bulk process allows a maximum amount of maleic anhydride, about 6% based on total monomer, that can be incorporated in the process while still keeping homogeneous reaction conditions and homogeneous product. Percentages of maleic anhydride, based on total monomer, larger than about 6% result in polymer precipitation at early stages of the reaction and useless product. To overcome this difficulty and incorporate larger percentages of maleic anhydride in the product, a solution process with polar solvents was devised. It was found that the best solvents for this process are ethyl acetate, chloroform, acetone or toluene or their mixtures. When compositions of maleic anhydride, based on total monomer, less than about 6% are sought, many more solvents can be used.

Many useful solvents are volatile and at the recommended temperatures of reaction they will tend to be in the gas phase, which will make them useless as solvents. In order to circumvent this difficulty the pressure of the reaction vessel can be adjusted by adding an inert gas such as nitrogen, carbon dioxide or argon, in such a way that the reaction is performed at a pressure higher than the vapor pressure of the reaction mixture and therefore most of the solvent remains in the liquid phase. Since the calculation of the vapor pressure of the reaction mixture can become complicated with polar solvents and its experimental evaluation is time consuming, a simpler rule to estimate the required pressure for the process, which also ensures that most of the solvent will remain in the liquid phase is given by the formula:

$2.5 \, P_o \, x_s$, if $x_s$ is less than about 0.2 and $1.4 \, P_o \, x_s$, if $x_s$ is equal or greater than about 0.2.

where $P_0$ is the vapor pressure of the solvent at the temperature of the reaction and $x_s$ is the mole fraction of solvent in the mixture of solvent and monomer. The coefficients used in this correlation were found by comparing the vapor pressure of the reaction mixture for several of the recommended solvents, estimated by rigorous thermodynamic calculations, with the value of the partial pressure exerted by the solvent and estimated as $P_0 \, x_s$. The value of the coefficients can be altered somewhat to achieve the objective.

With a low percentage of solvent, the solvent process is similar to the bulk process, and the solvent is mainly used to control the reaction rate, to better remove the heat of reaction, to lower the viscosity and to allow for larger compositions of maleic anhydride in the copolymer without having phase separation. A low percentage of solvent is preferably 10-30% by weight and more preferably 15-25% by weight with respect to the mixture of monomers and solvent. A solvent percentage of less than about 5% is of practically no use as the advantages of using solvent are not apparent, and then it is better to switch to a bulk process.

With a high percentage of solvent, the solution process is a typical solution process presenting much lower viscosity, lower rate of reaction, as well as easier temperature control and heat of reaction removal. Also, this range allows more easily to incorporate higher levels of maleic anhydride in a homogeneous product. A high solvent percentage preferably ranges between about 60 and about 95% by weight, more preferably between about 70 and about 90 weight % and most preferably between about 75 and about 88% by weight with respect to the mixture of monomers and solvent. A solvent percentage larger than about 95% leaves too little polymer to be produced and then the process becomes inefficient. Solvent percentages between about 30 and about 60% can be used, but they are too diluted to present the high productivity advantage of a bulk process and too concentrated to have the benefits given by the low viscosity of a typical solution process.

Preferred process temperatures are in the range of about 110 to about 200.degree. C., but more preferably in the range of about 120 to about 170.degree. C. and most preferably between about 120 and about 150.degree. C. Temperatures lower than about 110.degree. C. do not allow the nitroxide-type radical to act as a live polymer capping-decapping moiety, as is further explained below, because at these temperatures the nitroxide-type radical hinders the living character of the polymerization. Temperatures higher than about 200.degree. C. promote too many side reactions, and the living character of the polymerization is also hindered under these conditions. The initiator is typically used in a proportion of about 1 part of initiator to about 100 to about 12,000 parts in moles of monomer, more preferably about 1 mole of initiator to about 200 to about 3000 moles of monomer and most preferably about 1 mole of initiator to about 400 to about 1500 moles of monomer. Mole proportions of about 1 part of initiator to less than about 100 parts of monomer yield polymer of very low molecular weight, which is not very good for applications involving compatibilization of polymer blends. On the other hand, mole proportions of about 1 part of initiator to more than about 12,000 parts of monomer lead to polymerizations essentially thermally autoinitiated by styrene, with a corresponding loss of control of the polymer final molecular weight and loss of the living character of the polymerization.

The aforementioned initiators have half-life times in the order of a few minutes (less than 10) or less, at the preferred process temperatures. The amount of stable free radical (SFR) with respect to initiator is preferably in the range of about 1.3 to about 3.0 moles per mole of initiator, more preferably between about 1.6 and about 2.5 moles per mole of initiator and most preferably between about 1.9 and about 2.5 moles per mole of initiator. Ratios of SFR to initiator smaller than about 1.3 mole of SFR per mole of initiator lead to loss of the living character of the polymerization. On the other hand, ratios larger than about 3.0 moles of SFR per mole of initiator can slow down the reaction too much and make the process uneconomical. Also, during experimentation it was found that the molar ratio of SFR to initiator for assuring the living character of the polymerization depends on the concentration of UCA. The larger the concentration of UCA, the higher the recommended molar ratio of SFR to initiator for obtaining living character in the polymerization. This is believed to be due to the fact that the larger the concentration of UCA, the larger the reaction rate of the polymerization, and therefore, the greater the difficulty to achieve living character. Experimentally, it was found that for optimal results the molar ratio of stable free radical to initiator should be at least about the result of the calculation:

1.3+0.10*(weight percentage of UCA with respect to total monomers), preferably about 1.3+0.25*(weight percentage of UCA with respect to total monomers).

Lower molar ratios of SFR to initiator may result in the loss of living character of the polymerization.

With respect to composition, the percentage of UCA, for example maleic or itaconic anhydride, in the combined styrene—UCA amount is in the range of about 0.09 to about 18% in weight, more preferably from about 0.3 to about 5% and most preferably from about 0.9 to about 2% in weight. Compositions of UCA smaller than about 0.09% in weight may lead to poor functionalization of the copolymer, possibly with some polymer chains not having even one UCA unit, and with overall poor polymer blend compatibilization properties. On the other hand, compositions of UCA, in particular maleic anhydride, larger than about 18% can lead to very fast reaction rates and difficult-to-control reactions, as well as serious loss of the living character of the polymerization.

After charging the ingredients, styrene, UCA, initiator and stable free radical, into a reactor and heating to the proper temperature, most of the polymeric chains will start early in the reaction, since the initiator will decompose very fast at the specified temperature. During the investigation leading to the present invention, the inventors found that the reaction proceeds extremely fast during the initial stages, reaching moderate weight conversions of 20-30% in a few minutes. After this period the reaction slows down and proceeds at moderate reaction rates. The initial acceleration of the reaction rate seems to be due to the interaction between the styrene and the UCA, in particular maleic anhydride. The nearly simultaneous initiation of most of the chains will contribute to narrowing the polydispersity.

Also, soon after initiation, and having added only one or to a few monomeric units, each living (growing or active) polymer chain will become dormant (deactivation) after being capped by the stable free radical, which will be present in a slight excess with respect to the number of growing or living chains. The dormant chain will remain in that state for some time until the stable free radical is released again (activation) and the chain becomes active or living again, and capable of adding one or more monomeric units until it becomes again dormant. The cycle of states living-dormant-living-dormant repeats itself a number of times until no more monomer is available for reaction, or the temperature is lowered below the minimum temperature for activation of the stable free radical (below around 100.degree. C. for most of the available nitroxy radicals). Irreversible termination reactions, such as those occurring by coupling reactions between two living chains, are hindered due to the lower effective concentration of living polymer. The resulting process is similar to a true living process (for example, anionic polymerization) and it is therefore considered to be quasi-living (also called "controlled"). Since all the chains grow at approximately the same rate and are initiated at about the same time, the molecular weight distribution tends to be narrow, with relatively low polydispersity. It is well known in the art that the degree of livingness of such polymerizations can be measured by the degree of linearity of the polymer number average molecular weight growth with conversion, and by the shifting of curves of the molecular weight distribution toward larger values as the polymerization proceeds.

Another important feature of the inventive polymerization is the sequence of monomeric units of unsaturated cyclic anhydride (UCA) and styrene (S) along the polymeric chain. Since the proportion of UCA is relatively low, and given that the UCA tends to react in a nearly alternate fashion with S, all or most of the UCA will be consumed at early stages of the reaction, when similar molar amounts of S have been consumed. The consumption of most of the UCA will occur at a percent weight conversion that can be estimated as approximately twice the weight percent composition of UCA in the reactor feed. Up to this point, a random but nearly alternating block of styrene and UCA will have been formed. Afterwards, since the chains are still capable of growing in a stepwise fashion due to the dormant-living repetitive cycles, and given that most of the styrene is still unreacted, the chains will continue growing, adding styrene units and forming a second styrenic block along the polymeric chains until the monomer is depleted or the reaction is terminated otherwise. The resulting polymeric material has the structure described in the first embodiment of the present invention. The process just described can be regarded as a one chemical step process, since all the ingredients are charged at the beginning of the reaction, as opposed to other processes for building block copolymers, in which a second monomer mixture is added until the monomer mixture forming the first block is consumed. In the process just described, the temperature can be constant and set in one of the values mentioned in the preferred embodiments of the present invention, or can be changed in an increasing fashion, still in the range given in the preferred embodiments of this invention, in order to accelerate the monomer depletion after the initial conversion stages.

Yet another important feature of the inventive polymerization is the control of the total molecular weight and of the global composition of the polymer. In true living polymerization processes it is possible to estimate the number average molecular weight of a given reaction by dividing the mass of the monomer by the number of moles of the effective primary radicals generated by the initiator. The moles of effective primary radicals of initiator can be estimated as the number of free radicals generated by the initiator decomposition multiplied by the initiator efficiency. Since every effective primary radical generates a polymeric chain that grows throughout the polymerization, the number of polymer moles equals the number of moles of effective primary radicals. Although the process disclosed herein is not a completely living process, the aforementioned calculation gives an approximate estimation of the number average molecular weight of the polymer formed, so polymers of a given molecular weight can be designed in approximate fashion. A more precise estimation of the molar concentration of initiator needed for a specific number average molecular weight, obtained by linear regression of many experimental data generated during the investigation leading to this invention, is given by about $0.00775-5 \times 10^{-8}$ Mn, if the desired molecular weight is larger than about 61500, and $0.02519-3.33 \times 10^{-7}$ Mn if the desired molecular weight is smaller than about 61500.

in which Mn is the target number average molecular weight. Among the reasons for having two straight lines instead of one that would correspond to an ideal living process with instantaneous initiation, are that the process is not completely living and the presence of thermal autoinitiation of styrene, which is more pronounced in the range of large molecular weights (small initiator concentrations). On the other hand, the previous correlations give the best average value for the experimental data used, but the actual data show some dispersion due to the fact that the data include sets of experiments run in a variety of conditions with ample intervals of stable free radical to initiator ratio and different concentrations of maleic anhydride. The actual data fall in a band rather than on a line. The band is better represented by the following correlations:

A—$5 \times 10^{-8}$ Mn, if the desired molecular weight is larger than about 61500, and B—$3.33 \times 10^{-7}$ Mn, if the desired molecular weight is smaller than about 61500, in which Mn is the target number average molecular weight; A is between about 0.005 and about 0.01, and B is between about 0.016 and about 0.042.

As for the calculation of the average number of UCA groups in each polymer chain, this can be predicted with good approximation by assuming that all the UCA reacts. The number of UCA groups per polymer molecule equals the number of moles of UCA charged to the reactor divided by the number of polymer moles, which are estimated as stated in the previous paragraph. By using this calculation and that of the number average molecular weight, it is possible to design in advance the block copolymer with desired parameters.

Although two of the works reported as prior art (Benoit et al., 2000, and Park et al., 2000) describe different processes to obtain copolymers of styrene and UCA with a block structure that resembles the one described in this invention, they do not simultaneously provide a process that utilizes raw materials that are readily available and conditions to attain sufficiently large molecular weights needed for polymer compatibilization. Furthermore, those works present facts which are apparently contradictory. Benoit et al. argue that they are not able to obtain such block copolymer structure with simple TEMPO, and therefore, they use a combination of a more complex nitroxide radical and an alkoxyamine in order to control the copolymerization of styrene and maleic anhydride. On the other hand, Park et al. report the synthesis of such structures (albeit of relatively low molecular weight) with TEMPO as the stable free radical. After extensive experimentation by the present invention in which the relative composition of the components of the copolymerization system was varied, it was found that the ratio of nitroxide radical to initiator is an important parameter for obtaining the desired control of the polymerization leading to well defined block copolymer structures, and that this ratio depends on the amount of maleic anhydride that is to be copolymerized. The ratio of nitroxide radical to initiator (molar basis) should be varied from about 1.3 to about 2.5 or more in order to obtain control. A possible explanation for this, without being held to this theory, is that at the beginning of the copolymerization, in the presence of unreacted maleic anhydride, the effective rate of propagation of polymer chains is very high and higher concentrations of stable free radical are needed in order to exert control over these fast-growing chains. Relatively low concentrations of nitroxide radical, although useful in styrene homopolymerization, are not sufficient in this case to effectively compete with the fast chain propagation, leading to uncontrolled reactions.

Structure of the Block Copolymers

The assessment of the structure of the block copolymers formed is not a trivial matter. Global copolymer composition can be investigated, in general, by nuclear magnetic resonance of protons (H1 NMR), but this technique is limited to compositions of more than a few percent points of the less abundant component in a copolymer. Due to this limitation, this technique would be of little use for characterization of composition of the final copolymers formed, since many of the interesting compositions given in the embodiments of this invention have around or less than 1% of UCA. Therefore, in order to assess the specific copolymer structure provided by this invention, it was necessary to make kinetic investigations in which the evolution of the composition of the growing copolymer chains was studied by H1 NMR at different increasing conversions, especially in the low range (below 20-30%). At low conversions, and given that UCA mostly reacts at the initial stages of the reaction, the H1 NMR technique will be capable of detecting the composition of the incipient short chains rich in UCA. These measurements, together with measurements of molecular weight distributions that show some degree of livingness of the chains, provide evidence for supporting the presence of the structures described in the embodiments of the present invention. The livingness condition is necessary to guarantee that the same chains that showed a composition rich in UCA at low conversions and low molecular weight, grow to larger chains which are on average richer in styrene and which contain one end rich in UCA.

In other processes for the production of block copolymers using living polymerizations, a sequence of two chemical steps is necessary: in the first step the monomer forming the first block is homopolymerized until it is consumed, if pure blocks are to be obtained. If the first monomer is not totally consumed, it has to be removed before the second monomer is added. In a second chemical step the second monomer is added and it polymerizes extending the living chains formed during the first step and generating a second block. The need to remove the residual monomer and the charge of a second monomer, which has to be perfectly mixed before the second stage of the reaction proceeds, represent additional and likely difficult steps, which are avoided by the process of the present invention.

The rate of incorporation of the units of UCA, in particular maleic or itaconic anhydride, and of styrene is given by the inherent reactivities of these copolymerization systems, and the laws governing the incorporation of the monomers into a copolymer is well understood and is documented in standard books on free radical polymerization chemistry, such as in The Chemistry of Free Radical Polymerization by Graeme Moad and David H. Solomon, Pergamon, 1995. As mentioned in pages 280-283 of the cited reference, one of the simplest but most effective models that correlates the relative rates of monomer incorporation in a copolymer is the terminal model, which assumes that the reactivity of a polymeric radical towards a specific monomer only depends on the chemical nature of the terminal or active unit in the radical. According to this model, there are four possible propagation reaction rate constants of relevance; that is, the kinetic constants of propagation of a polymeric radical ending in monomer i, that reacts with monomer j. These are represented by kij, with ij assuming the values of 1 or 2 corresponding to monomer 1 or monomer 2. The kinetic scheme for the possible propagation reactions is represented as follows:

$$M_1^* + M_1 \xrightarrow{k_{11}} M_1^*$$
$$M_1^* + M_2 \xrightarrow{k_{12}} M_2^*$$
$$M_2^* + M_1 \xrightarrow{k_{21}} M_1^*$$
$$M_2^* + M_2 \xrightarrow{k_{22}} M_2^*$$

where $M_n^*$ represents the polymeric radical ending in monomeric unit n (n being i or j) and $M_n$ represents monomer n (n being i or j).

The reactivity ratios $r_n$ are defined as the ratio of the propagation constant of monomer n with its own radical type divided by the propagation constant of monomer n with a second radical type. For a two monomer system there are two reactivity ratios defined as follows:

$$r_1 = \frac{k_{11}}{k_{12}}$$
$$r_2 = \frac{k_{22}}{k_{21}}$$

The relative magnitudes of $r_1$ and $r_2$ determine the copolymer type that is going to be formed (for example random or alternating). In the case of the copolymerization of styrene and maleic anhydride, reported reactivity ratios experimentally measured are close to zero at temperatures below 80.degree. C. and the inventors are not aware of any data reported in the open literature at higher temperatures. For the pair styrene—itaconic anhydride the reactivity ratios are also close to zero although the one corresponding to itaconic anhydride is slightly larger than the styrene one. It is pertinent to say that there is some evidence that the terminal model may not adequately describe the mechanism of copolymerization of the two pairs of monomers mentioned; however, the reactivity ratios are used anyway to describe the observed behavior even for these systems.

Batch Process

The present invention also provides a one chemical step batch process to perform the polymerization reaction, but performed in two process stages as follows:
  a) in the first stage all the reactants are charged in a first reactor with agitation and heated up to conversions of about 10 to about 50%, and
  b) in the second stage the reaction continues heating in the same or in a different reactor vessel or vessels without agitation, up to conversions of about 90 to about 100%.

The reactor used in the first step is a well agitated reactor supplied with a helical-type or anchor-type impeller. This reactor must also have some means of exchanging heat with the exterior by a device such as a jacket or a coil for heating and cooling. After reaching conversions in the range of 10-50%, the viscosity of the reaction mixture will increase and stirring will be difficult, so the reaction should be continued without stirring, preferably in a different vessel without an agitation device for easier cleaning, such as a slab-shaped or cylinder-shaped reactor or reactors. This second reactor should also be provided with some way of exchanging heat such as an external jacket, immersion in a thermal fluid, or any other similar means. After reaching high conversion, which can be aided by increasing the temperature as the reaction time proceeds, the polymer is removed from the second stage reactor or reactors and ground into smaller pieces in a mechanical mill. Final conversions of less than about 90% are not convenient as much residual monomer would be left, affecting the properties and handling of the final product.

With reference to FIG. 2, a one-step batch process 10 according to the present invention is shown schematically. A solution of nitroxy radical and an unsaturated cyclic anhydride (UCA) in styrene are added to a tank 12, which is connected through a line 14 to a pump 16. The mixture in tank 12 is pumped through line 18 into a reactor 20. A catalyst or initiator is placed in tank 22, which is connected by a line 24 to a pump 26. Pump 26 pumps the catalyst or initiator through a line 28 into reactor 20. Reactor 20 is a continuous stirred tank reactor and is connected by a line 30 to a pump 32. A block copolymer is formed in reactor 20, and the copolymer and unreacted monomer, which is mainly styrene, are pumped by pump 32 through a line 34 to slab molds 36. Conversion in reactor 20 is typically in the range of from about 10 to about 50%. Slab molds 36 provide a second reactor vessel, which is without agitation, and heat is shown removed schematically through a line 38 to a thermal bath 40. Various methods can be used to remove heat, such as by a jacketed reactor or by circulation of reactants through a heat exchanger. Block copolymer from reactor 36 flows through a line 42 to an oven 44. Residual monomer is removed from the block copolymer in oven 44 and recycled. Block copolymer is removed from the oven and ground in a mechanical mill, which is not shown. The unsaturated cyclic anhydride, styrene, nitroxy radical and initiator can be charged directly to reactor 20. By adjusting or manipulating the ratio of initiator to monomer and/or the ratio of the nitroxy radical to initiator, the molecular weight of the block copolymer can be controlled. Examples are provided below, which provide further insight on the impact of these ratios on molecular weight. In this manner, the microstructure of the block copolymer can be controlled and thus made as desired. Reactor 20 has been shown as a continuous stirred tank reactor, but other types of reactors can be used, preferably providing some type of agitation. Reactor 36 has been shown as a slab mold reactor, but other types of reactors, such as a tubular reactor, can be used, preferably providing a quiescent reaction zone.

Continuous Process

The present invention further provides a bulk or solution continuous process to perform the polymerization reaction, comprising three process steps in series as follows:
a) One optional step heating the reaction mixture in a tubular-type reactor in which the exit fractional monomer conversion is numerically about twice or larger than the mass fraction of UCA in the feed (with respect to total monomer).
b) A second step involving heating the reaction mixture in a continuous stirred tank reactor with exit conversions between 10 and 50% weight, and
c) A third step heating in a tubular-type reactor in which the exit conversion is between about 60 and about 100%.

The first reactor is a tubular type reactor in order to achieve better heat removal during the polymerization stage in which the UCA is still reacting and the reaction rate is faster. A conversion numerically less than about twice the mass fraction of UCA in the monomer mixture in this stage may lead to molecular architectures of the polymer in which the UCA is not preferably located in a block of nearly alternating styrene-UCA structure. The reactor used in the second step is similar to the one just described for the batch process; that is, a well agitated reactor supplied with a helical-type or anchor-type impeller and provided with some means of exchanging heat with the exterior. The preferred conversions are between about 10 and about 50% at the temperatures preferred in this invention. Conversions smaller than about 10% will make the use of the first reactor inefficient and conversions larger than about 50% will make the process difficult to control due to the high viscosity of the reaction mixture and may broaden too much the molecular weight distribution of the polymer, rendering the material heterogeneous. The third reactor is a tubular type reactor to provide further conversion without broadening too much the molecular weight distribution, and allowing for easier polymer transport and heat removal. Tubular type reactors exhibit narrower residence time distributions than their agitated tank counterparts, and it is well known in the art that, for living or quasi-living polymerization reactions, the molecular weight distribution of the polymer is determined by the residence time distribution of the reactor. Also, since the conversion in the third reactor is higher than in the second one, the viscosity will also be very high and in these conditions tubular reactors provide a better way to transport the polymer and remove the heat of reaction, since these reactors generally do not require agitation and have a better area-to-volume ratio for heat exchange. Conversions smaller than about 60% at the exit result in an inefficient use of the third reactor and leave too much unreacted monomer. After the third reactor, the process must provide some means of removing the unreacted monomer, such as a devolatilizer equipment or a extruder with venting. Unreacted monomer can be recovered and recycled to the process.

Figure 3:
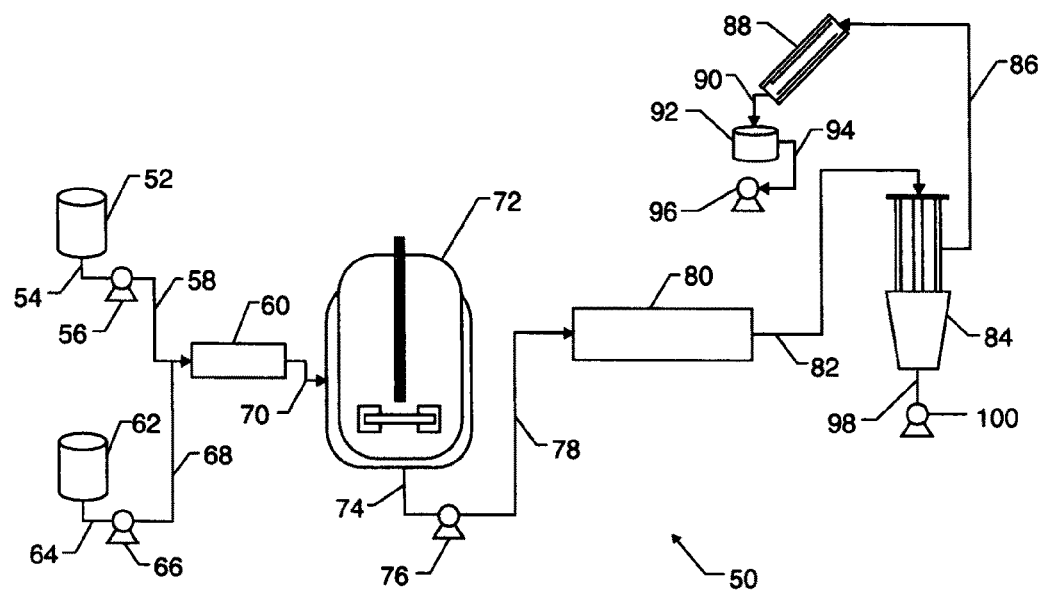
FIG. 3 is a schematic representation of a continuous process for making block copolymer according to the present invention.

With reference to FIG. 3, a process 50 is shown schematically according to the present invention. A solution of nitroxy radical and unsaturated cyclic anhydride in styrene are added to a tank 52. The contents of tank 52 flow through a line 54 to a pump 56, which pumps the contents through a line 58 to a tubular reactor 60. A catalyst or initiator is placed in tank 62, and the contents of tank 62 flow through a line 64 into a pump 66, which pumps the catalyst or initiator through a line 68 into tubular reactor 60. Block copolymer and unreacted monomer, which is mainly styrene, flow out of tubular reactor 60 through a line 70 into a reactor 72, which can be a continuous stirred tank reactor. A reactor with agitation is preferred. The conversion in tubular reactor 60 is preferably about twice the mass fraction of unsaturated cyclic anhydride, such as maleic anhydride.

Conversion in reactor 72 is preferably in the range of from about 10 to about 50%, and block copolymer and unreactor monomer, which is mainly styrene, flow out of reactor 72 through a line 74 into a pump 76, which pumps the fluid through a line 78 into a tubular reactor 80. A conversion ranging from about 60 to about 90% is achieved in tubular reactor 80, and block copolymer and unreacted monomer, which is mainly styrene, flow out of tubular reactor 80 through a line 82 into a devolatilizer 84. Monomer, mainly styrene, is recovered from devolatilizer 84 through a line 86, which flows into a condenser 88. A condensate is formed and flows through a line 90 into a condensate tank 92, and through a line 94 to a pump 96, the monomer can be recycled to tank 52. Block copolymer is withdrawn from devolatilizer 84 through a line 98 into a pump 100. By manipulating or adjusting the ratio of initiator to monomer and/or the ratio of stable free radical to initiator, the molecular weight of the block copolymer can be controlled. These variables can be adjusted to achieve a desired microstructure of the block copolymer.

The process of the present invention can be thought of in general terms as including the steps of heating styrene and an unsaturated cyclic anhydride at temperatures between about 110 and about 200.degree. C. and adding a free radical initiator to the reactor in a molar ratio of monomer to initiator of about 100 to about 12,000. Stable free radical is added to the reactor, and the molecular weight and microstructure of the product block copolymer can be controlled in part by adjusting the molar ratio of stable free radical to initiator according the formula 1.3+0.25 times the weight percent of unsaturated cyclic anhydride with respect to total monomer content. The weight percent of UCA with respect to total monomer is preferably between about 0.1 and about 6%. The reaction mixture is cooled, and a block copolymer according to the present invention is recovered by isolating the block copolymer from unreacted monomer. This process typically produces a molecular weight greater than about 25,000, and molecular weights in the range of from about 50,000 to about 100,000 can be controllably achieved. It is further believed that molecular weights of up to about 200,000 can also be achieved with the process of the present invention.

While the process described is a bulk process, alternatively, a solvent can be used. The same ratio of monomer to initiator works with the solvent-based process, and the same ratio of stable free radical to initiator can be used according to the formula above, but the rate percentage of UCA with respect to total monomer is preferably between about 0.1 and about 16%. Similar molecular weight for the block copolymer is achieved using the solvent-based process.

Blend Compatibilization

Another embodiment of this invention is the use of the styrene-unsaturated cyclic anhydride (UCA) block copolymer as a compatibilizer in compositions comprising a polymer miscible or compatible with the polystyrene block and an engineering thermoplastic containing functional moieties that can react with the dicarboxylic moiety of the UCA units in the styrene/UCA block copolymer. A further embodiment is the composition of matter resulting from this method of use.

Styrene-based polymers miscible or compatible with the polystyrene block of the aforementioned block copolymer include those which may be described as hydrogenated or partially hydrogenated homopolymers, and random, tapered, or block polymers (copolymers, including terpolymers, tetrapolymers, etc.) of conjugated dienes and/or monovinyl aromatic compounds. The conjugated dienes include isoprene, butadiene, 2,3-dimethylbutadiene and/or mixtures thereof, such as isoprene and butadiene. The monovinyl aromatic compounds include any of the following and mixtures thereof: monovinyl monoaromatic compounds, such as styrene or alkylated styrenes substituted at the alpha-carbon atoms of the styrene, such as alpha-methylstyrene, or at ring carbons, such as o-, m-, p-methylstyrene, ethylstyrene, propylstyrene, isopropylstyrene, butylstyrene, isobutylstyrene, tert-butylstyrene (e.g., p-tertbutylstyrene). Also included are vinylxylenes, methylethyl styrenes, and ethylvinylstyrenes. Specific examples include random polymers of butadiene and/or isoprene and polymers of isoprene and/or butadiene and styrene and also estero-specific polymers such as syndiotactic polystyrene. Typical block copolymers include polystyrene-polyisoprene, polystyrene-polybutadiene, polystyrene-polybutadiene-polystyrene, polystyrene-ethylene butylene-polystyrene, polyvinyl cyclohexane-hydrogenated polyisoprene, and polyvinyl cyclohexane-hydrogenated polybutadiene. Tapered polymers include those of the previous monomers prepared by methods known in the art. Other non-styrenic polymers miscible or compatible with the polystyrene block of the styrene-UCA copolymer include, but are not limited to, polyphenylene ether (PPE), polyvinyl methyl ether and tetramethyl polycarbonate.

The engineering thermoplastic to be modified in accordance with this invention will include: aliphatic and aromatic polycarbonates (such as bisphenol A polycarbonate), polyesters (such as poly(butylene terephthalate) and poly(ethylene terephthalate)), polyamides, polyacetal, polyphenylene ether or mixtures thereof. All these engineering thermoplastics are prepared according to well known commercial processes. Reference to such processes can be found in technical publications such as Encyclopedia of Polymer Science and Engineering, John Wiley and Sons., 1988, under the respective engineering thermoplastic polymer topic heading. Specific details on polycondensation engineering thermoplastics follow.

The polyphenylene ethers and polyamides of the present invention are as described in U.S. Pat. No. 5,290,863, which is incorporated herein by reference.

The polyphenylene ethers comprise a plurality of structural units having the formula:

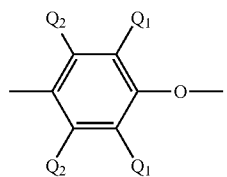

(I)

In each of said units, each independent $Q_1$ is independently halogen, primary or secondary lower alkyl (i.e. alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q_2$ is independently hydrogen, halogen, primary or secondary lower alkyl, phenyl, haloalkyl, hydrocarbonoxy or halohydrocarbonoxy as defined for $Q_1$.

Examples of suitable primary or lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl are isopropyl and sec-butyl.

Preferably, any alkyl radicals are straight chain rather than branched. Most often, each $Q_1$ is alkyl or phenyl, especially $C_{1-4}$ alkyl, and each $Q_2$ is hydrogen. Suitable polyphenylene ethers are disclosed in a large number of patents.

The polyphenylene ethers are typically prepared by the oxidative coupling of at least one corresponding monohydroxyaromatic compound. Particularly useful and readily available monohydroxyaromatic compounds are 2,6-xylenol, wherein each $Q_1$ is methyl and each $Q_2$ is hydrogen and wherein the resultant polymer is characterized as a poly(2,6-dimethyl-1,4-phenylene ether), and 2,3,6-trimethylphenol, wherein each $Q_1$ and one $Q_2$ are methyl and the other $Q_2$ is hydrogen.

Both homopolymer and copolymer polyphenylene ethers are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinyl aromatic compounds (e.g. styrene), or such polymers as polystyrenes or elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates quinones, heterocycles and formals.

The polyphenylene ether generally has a number average molecular weight within the range of about 3,000-40,000 and a weight average molecular weight within the range of about 20,000-80,000, as determined by gel permeation chromatography. Its intrinsic viscosity is most often in the range of about 0.15-0.6 dl/g, as measured in chloroform at 25° C.

The polyphenylene ethers which may be employed for the purposes of this invention include those which comprise molecules having at least one of the end groups of the formulae

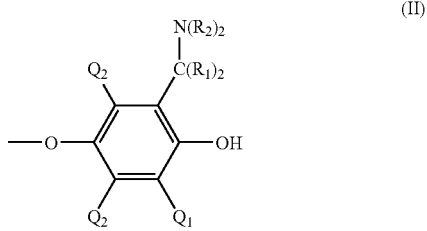

(II)

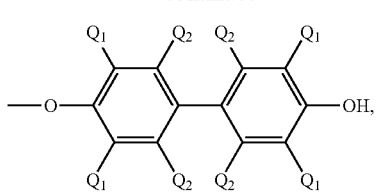

(III)

wherein $Q_1$ and $Q_2$ are as previously defined; each $R_1$ is independently hydrogen or alkyl, with the proviso that the total number of carbon atoms in both $R_1$ radicals is 6 or less; and each $R_2$ is independently hydrogen or a $C_{1-6}$ primary alkyl radical. Preferably, each $R_1$ is hydrogen and each $R_2$ is alkyl, especially methyl or n-butyl.

Polymers containing the aminoalkyl-substituted end groups of formula (II) may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the .alpha.-hydrogen atoms on one or more $Q_{.sub.1}$ radicals. The principal site of reaction is the $Q_{.sub.1}$ radical adjacent to the hydroxy group on the terminal unit of the polymer chain. During further processing and/or blending, the aminoalkyl-substituted end groups may undergo various reactions, probably involving a quinone methide-type intermediate of the formula

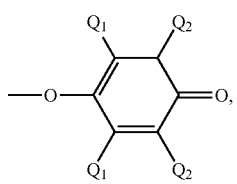

(IV)

with numerous beneficial effects often including an increase in impact strength and compatibilization with other blend components, as pointed out in references cited in U.S. Pat. No. 5,290,863.

It will be apparent to those skilled in the art from the foregoing that the polyphenylene ethers contemplated for use in the present invention include all those presently known, irrespective of variations in structural units or ancillary chemical features.

Polyamides included in the present invention are those prepared by the polymerization of a monoamino-monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above together with substantially equimolar proportions of a diamine and a dicarboxylic acid. The term "substantially equimolar" proportions includes both strictly equimolar proportions and slight departures therefrom which are involved in conventional techniques for stabilizing the viscosity of the resultant polyamides. The dicarboxylic acid may be used in the form of a functional derivative thereof, for example, an ester or acid chloride.

Examples of the aforementioned monoamino-monocarboxylic acids or lactams thereof which are useful in preparing the polyamides include those compounds containing from 2 to 16 carbon atoms between the amino and carboxylic acid groups, said carbon atoms forming a ring containing the CO(NH) group in the case of a lactam. As particular examples of aminocarboxylic acids and lactams there may be mentioned -aminocaproic acid, butyrolactam, pivalolactam, -caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

The dicarboxylic acids may be represented by the formula $$HOOC-B-COOH \qquad (V)$$

wherein

B is a divalent aliphatic or aromatic group containing at least 2 carbon atoms. Examples of aliphatic acids are sebacic acid, octadecanedioic acid, suberic acid, glutaric acid, pimelic acid and adipic acid.

Both crystalline and amorphous polyamides may be employed, with the crystalline species often being preferred by reason of their solvent resistance. Typical examples of the polyamides or nylons, as these are often called, include, for example, polyamide-6 (polycaprolactam), 6,6 (polyhexamethylene adipamide), 11, 12, 4,6, 6,10 and 6,12 as well as polyamides from terephthalic acid and/or isophthalic acid and trimethylhexamethylenediamine; from adipic acid and m-xylylenediamines; from adipic acid, azelaic acid and 2,2-bis(p-aminophenyl)propane or 2,2-bis-(p-aminocyclohexyl) propane and from terephthalic acid and 4,4'-diaminodicyclohexylmethane. Mixtures and/or copolymers of two or more of the foregoing polyamides or prepolymers thereof, respectively, are also within the scope of the present invention. Preferred polyamides are polyamide-6, 4,6, 6,6, 6,9, 6,10, 6,12, 11 and 12, most preferably polyamide-6,6. Commercially available thermoplastic polyamides may be advantageously used in the practice of this invention, with linear crystalline polyamides having a melting point between 165 and 230° C. being preferred.

Polyesters which may be employed as a component in compositions of the invention are, in general, relatively high in molecular weight and may be branched or linear polymers. These include polyesters such as polyethylene terephthalate (PET), polybutylene terephthalate (PBT), polycyclohexanebis-methylene terephthalate (PCT) and thermoplastic elastomeric, or combinations of these thermoplastic elastomeric polyesters with other above polyesters such as PBT. Polyesters suitable for compositions of the present invention include, in general, linear saturated condensation products of diols and dicarboxylic acids, or reactive derivatives thereof. Preferably, they are polymeric glycol esters of terephthalic acid and isophthalic acid. These polymers are available commercially or can be prepared by known techniques, such as by the alcoholysis of esters of the phthalic acid with a glycol and subsequent polymerization, by heating glycols with the free acids or with halide derivatives thereof, and similar processes. Such polymers and methods for their preparation are described further in references cited in U.S. Pat. No. 5,290,863, and elsewhere.

Preferred polyesters are of the family comprising high molecular weight, polymeric glycol terephthalates or isophthalates having repeating units of the formula

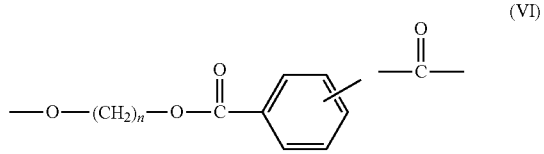 (VI)

where n is a whole number from two to ten, and more usually from two to four, and mixtures of such esters, including copolyesters of terephthalic and isophthalic acids of up to 30 mol percent isophthalic units.

Especially preferred polyesters are poly(ethylene terephthalate) and poly(1,4-butylene terephthalate).

Especially favored when high melt strength is important are branched high melt viscosity poly(1,4-butylene terephthalate) resins which include small amounts, for example, up to 5 mol percent based on the terephthalate units, of a branching component containing at least three ester forming groups. The branching component can be one which provides branching in the acid unit portion of the polyester, or in the glycol unit portion, or it can be a hybrid. Illustrative of such branching components are tri- or tetracarboxylic acids, such as trimesic acid, pyromellitic acid, and lower alkyl esters thereof, and the like, or preferably, tetrols, such as pentaerythritol, triols, such as trimethylolpropane, or dihydroxy carboxylic acids and hydroxydicarboxylic acids and derivatives, such as dimethyl hydroxyterephthalate, and the like. The addition of a polyepoxide, such as triglycidyl isocyanurate, which is known to increase the viscosity of the polyester phase through branching can aid in improving the physical properties of the present blends.

The branched poly(1,4-butylene terephthalate) resins and their preparation are described in U.S. Pat. No. 3,953,404.

Illustratively, the high molecular weight polyesters useful in the practice of this invention have an intrinsic viscosity of at least about 0.2 deciliters per gram, and more usually from about 0.4 to 1.5 deciliters per gram as measured in solution in ortho-chlorophenol or a 60/40 phenol/tetrachloroethane mixture at 25° to 30° C.

The linear polyesters include thermoplastic poly(alkylene dicarboxylates) and alicyclic analogs thereof. They typically comprise structural units of the formula:

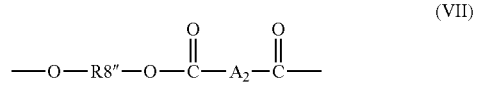 (VII)

wherein R8 is a saturated divalent aliphatic or alicyclic hydrocarbon radical containing about 2 to 10 and usually about 2 to 8 carbon atoms and $A_2$ is a divalent aromatic radical containing about 6 to 20 carbon atoms. They are ordinarily prepared by the reaction of at least one diol such as ethylene glycol, 1,4-butanediol or 1,4-cyclohexanedimethanol with at least one aromatic dicarboxylic acid such as isophthalic or terephthalic acid, or lower alkyl ester thereof. The polyalkylene terephthalates, particularly polyethylene and polybutylene terephthalate and especially the latter, are preferred. Such polyesters are known in the art as illustrated by references cited in U.S. Pat. No. 5,290,863.

The linear polyesters generally have number average molecular weights in the range of about 20,000 to 70,000, as determined by intrinsic viscosity (IV) at 30° C. in a mixture of 60% (by weight) phenol and 40% 1,1,2,2-tetrachloroethane. When resistance to heat distortion is an important factor, the polyester molecular weight should be relatively high, typically above about 40,000.

The polycarbonates suitable to be used in the present compositions include aliphatic and aromatic polycarbonates. Starting materials for aliphatic polycarbonates are diols and carbonates, eg, diethyl of diphenyl carbonate which are obtained by phosgentaion of hydroxy compounds or 1,3-dioxolan-2-ones formed from $CO_2$ and oxiranes. Aliphatic polycarbonates may also be prepared from 1,3-dioxan-2-ones obtained by thermal depolymerization of the corresponding polycarbonates.

Current methods for the preparation of aliphatic polycarbonates include transesterification of diols with lower dialkyl carbonates, dioxolanones or diphenyl carbonate in the presence of catalyst such as alkaly metal, tin and titanium compounds. Ring-opening polymerization of six-membered cyclic carbonates (1,3-dioxan-2-ones), in the presence of bicyclic carbonates which act as crosslinking agents, leads to hard, tough thermosets. Crosslinked polycarbonates with outstanding properties are also obtained by free radical polymerization of diethylene glycol bis(allylcarbonate). Based on ethylene glycol carbonate, other phosgene routes have been found, starting with $CO_2$ with urea or a dialkyl carbonate as an intermadiate, or from CO. Other routes involves the cationic or free radical, ring-opening polymerization of cyclic ortho esters of carbonic acid. These reactions give polyether polycarbonates.

The molecular weights of linear aliphatic polycarbonates are process-dependent and are between 500 and 5000. Polycarbonates with molecular weights up to about 30,000 are obtained by transesterification, whereas those with a molecular weight greater than 50,000 are prepared by polymerization of carbonates possessing six-membered rings.

Among the preferred polycarbonates are the aromatic polycarbonate homopolymers. The structural units in such homopolymers generally have the formula

 (VIII)

wherein $A_3$ is an aromatic radical. Suitable $A_3$ radicals include m-phenylene, p-phenylene, 4,4'-biphenylene, 2,2-bis (4-phenylene)propane, 2,2-bis(3,5-dimethyl-4-phenylene) propane and similar radicals such as those which correspond to the dihydroxyaromatic compounds disclosed by name or formula, generically or specifically, in U.S. Pat. No. 4,217,438. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $A_3$ radicals are hydrocarbon radicals.

The $A_3$ radicals preferably have the formula

 (IX)

wherein each of $A_4$ and $A_5$ is a single-ring divalent aromatic radical and Y is a bridging radical in which one or two atoms separate $A_4$ and $A_5$. The free valence bonds in formula IX are usually in the meta or para positions of $A_4$ and $A_5$ in relation to Y. Such $A_3$ values may be considered as being derived from bisphenols of the formula HO-A-Y-$A_5$—OH. Frequent reference to bisphenols will be made hereinafter, but it should be understood that $A_3$ values derived from suitable compounds other than bisphenols may be employed as appropriate.

In formula IX, the $A_4$ and $A_5$ values may be unsubstituted phenylene or substituted derivatives thereof, illustrative substituents being one or more alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A_4$ and $A_5$ are preferably p-phenylene, although both may be o- or m-phenylene, or one may be o-phenylene or m-phenylene and the other p-phenylene.

The bridging radical, Y, is one in which one or two atoms, preferably one, separate $A_4$ from $A_5$. It is most often a hydrocarbon radical, and particularly a saturated radical such as methylene, cyclohexylmethylene, 2-[2.2.1]-bicycloheptylmethylene, ethylene, 2,2-propylene, 1,1-(2,2-dimethylpropylene), 1,1-cyclohexylene, 1,1-cyclopentadecylene, 1,1-cyclododecylene or 2,2-adamantylene, especially a gemalkylene radical. Also included, however, are unsaturated radicals and radicals which are entirely or partially composed of atoms other than carbon and hydrogen. Examples of such radicals are 2,2-dichloroethylidene, carbonyl, thio, oxy, and sulfone. For reasons of availability and particular suitability for the purposes of this invention, the preferred radical of formula IX is the 2,2-bis(4-phenylene)propane radical, which is derived from bisphenol-A and in which Y is isopropylidene and $A_4$ and $A_5$ are each p-phenylene.

Various methods of preparing polycarbonate homopolymers are known. They include interfacial and other methods in which phosgene is reacted with bisphenols, transesterification methods in which bisphenols are reacted with diaryl carbonates, and methods involving conversion of cyclic polycarbonate oligomers to linear polycarbonates. The latter method is disclosed in U.S. Pat. Nos. 4,605,731 and 4,644,053.

A preferred polyhydric phenol is a dihydric phenol such as bisphenol A. Suitable polycarbonate resins for the practice of the present invention may be any commercial polycarbonate resin. The weight average molecular weight of suitable polycarbonate resins (as determined by gel permeation chromatography relative to polystyrene) may range from about 20,000 to about 500,000, preferably from about 40,000 to about 400,000. However, compositions in which polycarbonates have a molecular weight in the range of about 80,000-200,000 often have favorable properties.

It is also possible in the polymer mixture according to the invention to use a mixture of different polycarbonates as mentioned hereinbefore as an aromatic polycarbonate.

Generally a minimum of about 1 wt % of the styrene-UCA block copolymer of the invention will be sufficient to observe compatibilization effects on the engineering thermoplastic blend compositions in which used, such as improvements on mechanical properties. The block copolymer can also be used in amounts higher than the minimum but limited to a range so that it will positively affect the blend characteristics without substantially degrading other sought characteristics. Thus typical blends will comprise the following: (a) engineering thermoplastic, 98-1 wt % (b) thermoplastic polymer, 1-98 wt %; and (c) styrene-UCA copolymer, 1-20 wt %. Preferred engineering thermoplastic blends of this invention comprise from about 40 to about 90 wt % engineering thermoplastic, 10-60 wt % thermoplastic miscible or compatible with polystyrene and about 2 to about 5 wt % of the styrene-UCA block copolymer. This range of compositions will usually yield materials with improved impact properties and mechanical strength.

Generally, the blend compositions of the invention can be prepared by mixing the engineering thermoplastic, the thermoplastic miscible/compatible with polystyrene and the block copolymer of the invention (styrene-UCA), in any order and subjecting the mixture to temperatures sufficient to melt the mixture, for example, 180° C. and up. Such mixing and heating can be accomplished using conventional polymer processing equipment known in the art, such as batch mixers, single or multiple screw extruders, continuous kneaders, etc. Furthermore the compatibilized compositions of the present invention may contain various additives, for example, stabilizers, flame retardants, anti-oxidants, fillers, processing aids and pigments in normal and conventional amounts, dependent upon the desired end-use. As examples of the fillers, there may be mentioned, e.g., metal oxides such as iron and nickel oxide, nonmetals such as carbon fiber, silicates (e.g. mica, aluminum silicate (clay)), titanium dioxide, glass flakes, glass beads, glass fibers, polymer fibers, etc. If used, the conventional additives and fillers are mechanically blended and the compositions of the invention are then molded in known methods.

Another aspect of this invention is the use of the styrene-unsaturated cyclic anhydride (UCA) block copolymer as a coupling agent for polystyrene, copolymers of styrene and polymers miscible or compatible with the polystyrene block and various fillers containing functional moieties that show strong chemical affinity or can react with the dicarboxylic moiety of the UCA units in the styrene/UCA block copolymer. A further embodiment is the composition of matter resulting from this method of use. Thus, typical compositions will comprise the following: (a) polystyrene, copolymers of styrene or polymers miscible with the polystyrene block of the block, 40-98 wt % (b) filler, 1-50 wt %; and (c) styrene-UCA copolymer, 1-20 wt %. Preferred compositions of this invention will comprise 60-89 wt % of (a), 10-30% of (b) and 2-10 wt % of (c).

Styrene-based polymers miscible or compatible with the polystyrene block of the above mentioned block copolymer include those which may be described as hydrogenated or partially hydrogenated homopolymers, and random, tapered, or block polymers (copolymers, including terpolymers, tetrapolymers, etc.) of conjugated dienes and/or monovinyl aromatic compounds. The conjugated dienes including isoprene, butadiene, 2,3-dimethylbutadiene and/or mixtures thereof, such as isoprene and butadiene. The monovinyl aromatic compounds include any of the following or mixtures thereof monovinyl monoaromatic compounds, such as styrene or alkylated styrenes substituted at the alpha-carbon atoms of the styrene, such as alpha-methylstyrene, or at ring carbons, such as o-, m-, p-methylstyrene, ethylstyrene, propylstyrene, isopropylstyrene, butylstyrene, isobutylstyrene, tert-butylstyrene (e.g., p-tertbutylstyrene). Also included are vinylxylenes, methylethyl styrenes, and ethylvinylstyrenes. Specific examples include random polymers of butadiene and/or isoprene and polymers of isoprene and/or butadiene and styrene and also estero-specific polymers such as syndiotactic polystyrene. Typical block copolymers include polystyrene-polyisoprene, polystyrene-polybutadiene, polystyrene-polybutadiene-polystyrene, polystyrene-ethylene butylene-polystyrene, polyvinyl cyclohexane-hydrogenated polyisoprene, and polyvinyl cyclohexane-hydrogenated polybutadiene. Tapered polymers include those of the previous monomers prepared by methods known in the art. Other non-styrenic polymers miscible or compatible with the polystyrene block of the styrene-UCA copolymer include, but are not limited to, polyphenylene ether (PPE), polyvinyl methyl ether and tetramethyl polycarbonate.

As examples of the fillers, there may be mentioned, e.g., metal oxides such as iron and nickel oxide, nonmetals such as carbon fiber, silicates (e.g. mica, aluminum silicate (clay)), titanium dioxide, glass flakes, glass beads, glass fibers, polymer fibers, etc. The preferred filler is glass fiber containing epoxy and/or amino sizing due to great affinity of these type of compounds for the double carboxylic moieties of the UCA units. Examples of glass fiber include types E, C, A, S and M in any combinations of number of filament per strand, strand configurations and fiber length-to-weight ratio as possible. The preferred form of the glass fiber is chopped strands in lengths ranging from one-eighth inch to 1 inch.

The following Examples illustrate the invention in more detail. They are not to be construed as limiting the instant invention in any manner whatsoever. The invention is declared to cover all changes and modifications of the specific examples which do not constitute departure from the spirit and scope of the invention.

EXAMPLE I

Bulk copolymerization of styrene and maleic anhydride at 120° C. in 20 ml quiescent vials. A solution of styrene (Aldrich, 99% purity), with varying amounts (5, 10 and 15 wt. %) of maleic anhydride (Aldrich, 99%), benzoyl peroxide (BPO, Akzo, purified to 99%), 0.033M, as initiator and 4-hydroxy 2,2,6,6 tetramethyl-piperidine-N-oxyl (HO-TEMPO, 99%, from Ciba, Puebla, Mexico) as stable free radical, was heated in an oil bath kept at 120° C. The HO-TEMPO/BPO molar ratio was kept constant. The molar ratio of HO-TEMPO to BPO was 1.3. Maleic anhydride was purified by crystallization in chloroform and the styrene monomer was washed with sodium hydroxide.

Vials with identical formulations were removed from the oil bath at different time intervals as indicated in Table I, and the reaction quenched by immersing the vials in a water bath maintained at freezing temperature. Average molecular weight and its distribution were measured using GPC [Waters 410, RI detector, THF eluent, 1.0 mL/min, at 40° C.; Styragel linear columns HR 5, HR 4, HR 3, employing polystyrene as a standard].

Conversion, molecular weight and its distribution are collected in Table I. High molecular weights are reached at even moderate conversions and the molecular weight shows steady growth with increasing conversions. Final polydispersities (PD) are below 3, even for high content (15%) of maleic anhydride.

TABLE I

| Sample Code | Maleic Anhydride wt./ | Reaction Time (hr) | /Conversion | Mn | Mw | PD |
|---|---|---|---|---|---|---|
| 1 | 5 | 0.333 | 27.53 | 42 885 | 94 902 | 2.21 |
| 2 | 5 | 1 | 30.41 | 44 835 | 101 449 | 2.26 |
| 3 | 5 | 3 | 42.96 | 55 596 | 112 657 | 2.03 |
| 4 | 5 | 5 | 56.76 | 66 482 | 152 832 | 2.30 |
| 5 | 10 | 0.333 | 40.77 | 53 182 | 255 176 | 4.80 |
| 6 | 10 | 1 | 44.40 | 60 305 | 327 216 | 5.43 |
| 7 | 10 | 3 | 54.47 | 58 468 | 232 586 | 3.98 |
| 8 | 10 | 5 | 65.75 | 68 201 | 190 687 | 2.80 |
| 9 | 15 | 0.333 | 54.33 | 55 666 | 211 853 | 3.81 |
| 10 | 15 | 1 | 58.53 | 57 084 | 241 962 | 4.24 |
| 11 | 15 | 3 | 66.32 | 68 556 | 351 502 | 5.13 |
| 12 | 15 | 5 | 74.66 | 73 459 | 213 474 | 2.91 |

EXAMPLE II

Styrene (Pemex, industrial grade) was copolymerized with maleic anhydride (Aldrich, 95%) in the presence of 4-oxo 2,2,6,6 tetramethyl-piperidine-N-oxyl (oxo-TEMPO from Crompton Corp., Middlebury, Conn.) as stable free radical agent and BPO (Akzo, 75%) as initiator at 120° C. and 130° C., to prepare copolymer poly((styrene-r-MA)-co-styrene) in a Parallel Polymerization Reactor (PPR, Symyx™). The reaction volume in each mini-reactor was 3 ml. Table II shows the change of average molecular weight with time. Molar ratio f stable free radical to initiator used was [oxo-TEMPO]/[BPO]=1.3 and initial [BPO]=0.003M

TABLE II

| Sample | Reaction Time (hr) | Mn | Mw | PD |
|---|---|---|---|---|
| 13a | 1 | 17,400 | 44,700 | 2.57 |
| 13b | 3 | 55,500 | 107,500 | 1.93 |
| 13c | 5 | 55,100 | 123,100 | 2.23 |
| 13d | 9 | 75,600 | 142,700 | 1.89 |
| 13e | 12 | 98,200 | 168,900 | 1.72 |

Table II shows data on the molecular weight distribution obtained at different reaction times for a content of MA of 0.5%. Molecular weight distributions were measured in a GPC HP series 1100, UV detector, THF eluent, flow 1 mL/min, 40° C.; Plgel 10 µm and 5 µm mixed-B columns. Notice the increase in molecular weight and general decrease in polydispersity as conversion increases, typical of nitroxide controlled polymerizations.

The resulting styrene/MA copolymer was characterized by H NMR spectra, recorded at room temperature on a Bruker AC-250 FT NMR spectrometer. Ten milligrams of the copolymer were dissolved in 0.5 mL of $CDCl_3$ (20 wt/vol %) and the solution subjected to $^1$H NMR measurements.

Table III shows copolymer composition by H NMR spectra for styrene/MA copolymers produced from reaction 13 (120° C., 0.5 wt % of MA, samples 13a-13e in Table II), as well as from reactions 14 (120° C., 0.3 wt % of MA) and 15 (130° C., 0.3 wt % of MA). Notice how as each reaction proceeds, the MA composition decreases, indicating MA consumption early in the reaction. NMR calculated compositions below 1% are not quantitatively reliable, but they can be used to indicate trends. The most reliable value (sample 13a, 1 hr.) is close to the theoretically expected value.

TABLE III

| Sample | Reaction Time (hr) | % mol M Anh | Temperature |
|---|---|---|---|
| 13a (10 maleic groups/chain)* | 1 | 5.69 (9.4 measured units of MA) | 120° C. |
| 13b (10 maleic groups/chain)* | 3 | 0.74 (4.4 measured units of MA) | 120° C. |
| 14a (3 maleic groups/chain)* | 1 | 0.84 | 120° C. |
| 14b (3 maleic groups/chain)* | 3 | 0.33 | 120° C. |
| 15a (3 maleic groups/chain)* | 1 | 2.59 | 130° C. |
| 15b (3 maleic groups/chain)* | 3 | 0.57 | 130° C. |

*Theoretical calculation based on reaction feed

EXAMPLE III

Copolymerization of styrene (Pemex, industrial grade for samples 16-19 and Aldrich, 99% for samples 20-23) with maleic anhydride (Aldrich, >95%) in the presence of HO-TEMPO (Ciba, 99%, Puebla, Mexico) or oxo-TEMPO (Crompton Corp., Middlebury, Conn.) as stable free radical agent and BPO (Akzo, >75%) as initiator at 120° C. Reaction proceeds up to 20-30% conversion in a jacketed 2 L stirred (106 rpm) glass reactor connected to an oil bath recirculator, and then the syrup is emptied into quiescent cylindrical, 0.2 L, stainless steel (SS) reactors, placed in a 120° C. constant temperature oil bath to prepare copolymer poly((styrene-r-MA)-co-styrene) in a quasi-living process. Final conversions after 24 hrs were close to 100% in all cases. Table IV shows the final average molecular weight after 24 hrs of reaction in the SS reactors, for 8 different reactions in which different total lengths and levels of functionalization were aimed at. The samples were characterized using GPC [Waters 410, RI detector, THF eluent, 1.0 mL/min, at 40° C.; Styragel linear columns HR 5, HR 4, HR 3]. The interaction of low levels of initiator concentration combined with high levels of MA tends to increase the polydispersity.

TABLE IV

| Sample Code | Wt. % Maleic Anhydride | [BPO], M | [Nitroxide], M | Controller Type | Mn | Mw | PD |
|---|---|---|---|---|---|---|---|
| 16 | 0.9429 | 0.0335 | 0.0436 | oxoTEMPO | 22 100 | 30 685 | 1.39 |
| 17 | 0.1885 | 0.0067 | 0.0087 | oxoTEMPO | 58 614 | 78 664 | 1.34 |
| 18 | 4.7300 | 0.0336 | 0.0437 | oxoTEMPO | 22 505 | 29 959 | 1.33 |
| 19 | 0.9429 | 0.0044 | 0.0057 | oxoTEMPO | 74 526 | 102 377 | 1.37 |
| 20 | 4.7300 | 0.0030 | 0.0039 | HO-TEMPO | 77 566 | 202 424 | 2.70 |
| 21 | 8.0000 | 0.0030 | 0.0039 | HO-TEMPO | 76 361 | 172 708 | 2.26 |
| 22 | 4.7300 | 0.0030 | 0.0075 | HO-TEMPO | 72 270 | 180 526 | 2.50 |
| 23 | 6.0000 | 0.0030 | 0.0105 | HO-TEMPO | 55 251 | 136 005 | 2.46 |

EXAMPLE IV

Extensive testing for measuring the influence of initial initiator concentration (benzoyl peroxide, Akzo purified to 99%) on final molecular weight and polydispersity of the controlled copolymerization of styrene (Aldrich, 99%), maleic anhydride (Aldrich, 99%) was done. All experiments were run for 24 hours, controlled with OH-TEMPO (Ciba, Puebla, Mexico, 99%), in bulk, in a combinatorial parallel polymerization reactor (PPR Symyx™) at 120° C. and agitation at 100 rpm, until stirring was permitted due to the reaction media increasing viscosity. Table V shows results for varying concentrations of benzoyl peroxide (BPO) and two different initial concentrations of maleic anhydride. The results in Table V correspond to a molar ratio of HO-TEMPO to initiator of 1.3. Tables VI and VII correspond to similar results but for molar ratios of HO-TEMPO to initiator of 1.6 and 1.9, respectively. Molecular weight distributions were measured in a rapid GPC from Symyx, with Evaporative Light Scattering Detector (ELSD), THF eluent, 40.degree. C. and 3 serial columns Plgel 110 m mixed-B from Polymer Labs.

TABLE V

| Sample Code | [I0], M | MA wt % | Mw | Mn | PD |
|---|---|---|---|---|---|
| 24a | 0.001 | 0.1885 | 2.525E+05 | 1.962E+05 | 1.29 |
| 24b | 0.002 | 0.1885 | 1.549E+05 | 1.301E+05 | 1.19 |
| 24c | 0.003 | 0.1885 | 1.208E+05 | 1.027E+05 | 1.18 |
| 24d | 0.005 | 0.1885 | 7.987E+04 | 6.881E+04 | 1.16 |
| 24e | 0.0067 | 0.1885 | 6.534E+04 | 5.472E+04 | 1.19 |
| 24f | 0.0075 | 0.1885 | 5.386E+04 | 4.725E+04 | 1.14 |
| 24g | 0.01 | 0.1885 | 4.916E+04 | 4.369E+04 | 1.13 |
| 24h | 0.0168 | 0.1885 | 2.180E+04 | 1.934E+04 | 1.13 |
| 24i | 0.001 | 0.9429 | 1.453E+05 | 1.171E+05 | 1.24 |
| 24j | 0.002 | 0.9429 | 1.244E+05 | 1.011E+05 | 1.23 |
| 24k | 0.003 | 0.9429 | 1.324E+05 | 1.112E+05 | 1.19 |
| 24l | 0.005 | 0.9429 | 8.098E+04 | 7.020E+04 | 1.15 |
| 24m | 0.0067 | 0.9429 | 6.576E+04 | 5.354E+04 | 1.23 |
| 24n | 0.0075 | 0.9429 | 8.606E+04 | 7.302E+04 | 1.18 |
| 24o | 0.01 | 0.9429 | 5.135E+04 | 3.967E+04 | 1.29 |
| 24p | 0.0168 | 0.9429 | 2.831E+04 | 2.480E+04 | 1.14 |

TABLE VI

| Sample Code | [I0], M | MA wt % | Mw | Mn | PD |
|---|---|---|---|---|---|
| 25a | 0.001 | 0.1885 | 1.581E+05 | 1.304E+05 | 1.21 |
| 25b | 0.002 | 0.1885 | 1.252E+05 | 9.914E+04 | 1.26 |
| 25c | 0.003 | 0.1885 | 8.796E+04 | 7.754E+04 | 1.13 |
| 25d | 0.005 | 0.1885 | 6.487E+04 | 5.612E+04 | 1.16 |
| 25e | 0.0067 | 0.1885 | 5.689E+04 | 5.057E+04 | 1.12 |
| 25f | 0.0075 | 0.1885 | 6.587E+04 | 5.918E+04 | 1.11 |
| 25g | 0.01 | 0.1885 | 2.928E+04 | 2.625E+04 | 1.12 |
| 25h | 0.0168 | 0.1885 | 1.146E+04 | 1.016E+04 | 1.13 |
| 25i | 0.001 | 0.9429 | 1.958E+05 | 1.594E+05 | 1.23 |
| 25j | 0.002 | 0.9429 | 1.295E+05 | 1.080E+05 | 1.20 |
| 25k | 0.003 | 0.9429 | 1.366E+05 | 9.889E+04 | 1.38 |
| 25l | 0.005 | 0.9429 | 8.737E+04 | 7.250E+04 | 1.21 |
| 25m | 0.0067 | 0.9429 | 7.181E+04 | 5.986E+04 | 1.20 |
| 25n | 0.0075 | 0.9429 | 6.660E+04 | 5.700E+04 | 1.17 |
| 25o | 0.01 | 0.9429 | 5.706E+04 | 4.297E+04 | 1.33 |
| 25p | 0.0168 | 0.9429 | 4.418E+04 | 2.741E+04 | 1.61 |

TABLE VII

| Sample Code | [I0], M | MA wt % | Mw | Mn | PD |
|---|---|---|---|---|---|
| 26a | 0.001 | 0.1885 | 1.754E+05 | 1.438E+05 | 1.22 |
| 26b | 0.002 | 0.1885 | 1.466E+05 | 1.081E+05 | 1.36 |
| 26c | 0.003 | 0.1885 | 8.382E+04 | 7.422E+04 | 1.13 |
| 26d | 0.005 | 0.1885 | 5.678E+04 | 5.030E+04 | 1.13 |
| 26e | 0.0067 | 0.1885 | 4.550E+04 | 3.970E+04 | 1.15 |
| 26f | 0.0075 | 0.1885 | 3.651E+04 | 3.271E+04 | 1.12 |

TABLE VII-continued

| Sample Code | [I0], M | MA wt % | Mw | Mn | PD |
|---|---|---|---|---|---|
| 26g | 0.01 | 0.1885 | 2.401E+04 | 2.123E+04 | 1.13 |
| 26h | 0.0168 | 0.1885 | 1.021E+04 | 9.029E+03 | 1.13 |
| 26i | 0.001 | 0.9429 | 1.505E+05 | 1.238E+05 | 1.22 |
| 26j | 0.002 | 0.9429 | 1.292E+05 | 1.079E+05 | 1.20 |
| 26k | 0.003 | 0.9429 | 1.005E+05 | 8.239E+04 | 1.22 |
| 26l | 0.005 | 0.9429 | 7.090E+04 | 5.818E+04 | 1.22 |
| 26m | 0.0067 | 0.9429 | 5.829E+04 | 4.427E+04 | 1.32 |
| 26n | 0.0075 | 0.9429 | 6.392E+04 | 5.083E+04 | 1.26 |
| 26o | 0.01 | 0.9429 | 4.997E+04 | 3.835E+04 | 1.30 |
| 26p | 0.0168 | 0.9429 | 3.413E+04 | 2.609E+04 | 1.31 |

Polydispersity is lower at lower levels of maleic anhydride, higher levels of HO-TEMPO and higher levels of initiator (at constant HO-TEMPO/initiator ratio)

EXAMPLE V

Solution polymerization was performed using styrene (Aldrich, 99%) and maleic anhydride (Aldrich, 95%) as monomers, in the presence of solvent (toluene, see Table VIII and xylene, see Table IX), hydroxy-TEMPO (Ciba, Puebla, Mexico, 99%) as stable free radical agent and BPO (Akzo, 75%) as initiator (0.0065 M) at 120° C. The reactions were run in a combinatorial parallel polymerization reactor (PPR Symyx™). For each solvent a 2×2×3 factorial experiment was run varying the monomer/solvent ratio (two levels), nitroxide to initiator ([NOx]/[I0]) ratio (two levels), and maleic anhydride % wt. (3 levels). Three samples at different reaction times were extracted for each combination of the factorial, the reaction was inhibited and the resulting polymer analyzed for conversion by gravimetry and for molecular weight by GPC (rapid GPC Symyx™ equipment, ELSD detector, THF eluent, 60° C., Plgel 10 μm mixed-B columns). Results are given in Tables VIII and IX for toluene and xylene, respectively.

TABLE VIII

| Sampl Code | Monomer/Solvent Ratio | [NOx]/[$I_0$] | Maleic Anhydride Wt. % | Reaction Time (hr) | % Conversion | Mw | Mn | PD |
|---|---|---|---|---|---|---|---|---|
| 27a | 50-50 | 1.3 | 0.5 | 1 | 5.36 | 38511 | 22205 | 1.73 |
| 27b | 50-50 | 1.3 | 0.5 | 10 | 14.78 | 58688 | 40676 | 1.44 |
| 27c | 50-50 | 1.3 | 0.5 | 17 | 20.81 | 66272 | 44785 | 1.48 |
| 28a | 50-50 | 1.9 | 0.5 | 1 | 3.70 | 24743 | 11968 | 2.07 |
| 28b | 50-50 | 1.9 | 0.5 | 10 | 11.67 | 40802 | 30506 | 1.34 |
| 28c | 50-50 | 1.9 | 0.5 | 17 | 17.72 | 50728 | 36507 | 1.39 |
| 29a | 50-50 | 1.3 | 2 | 1 | 6.65 | 40028 | 23464 | 1.71 |
| 29b | 50-50 | 1.3 | 2 | 10 | 13.85 | 60852 | 43337 | 1.40 |
| 29c | 50-50 | 1.3 | 2 | 17 | 22.24 | 65580 | 42842 | 1.53 |
| 30a | 50-50 | 1.9 | 2 | 1 | 4.94 | 32412 | 15713 | 2.06 |
| 30b | 50-50 | 1.9 | 2 | 10 | 13.03 | 45156 | 31437 | 1.44 |
| 30c | 50-50 | 1.9 | 2 | 17 | 17.15 | 55682 | 39932 | 1.39 |
| 31a | 50-50 | 1.3 | 5 | 1 | 5.78 | 42052 | 22585 | 1.86 |
| 31b | 50-50 | 1.3 | 5 | 10 | 14.86 | 62517 | 43042 | 1.45 |
| 31c | 50-50 | 1.3 | 5 | 17 | 20.02 | 72159 | 45801 | 1.58 |
| 32a | 50-50 | 1.9 | 5 | 1 | 5.35 | 38699 | 19902 | 1.94 |
| 32b | 50-50 | 1.9 | 5 | 10 | 14.02 | 54150 | 35034 | 1.55 |
| 32c | 50-50 | 1.9 | 5 | 17 | 22.23 | 63602 | 40670 | 1.56 |
| 33a | 75-25 | 1.3 | 0.5 | 1 | 14.03 | 47363 | 27517 | 1.72 |
| 33b | 75-25 | 1.3 | 0.5 | 10 | 41.51 | 76284 | 51850 | 1.47 |
| 33c | 75-25 | 1.3 | 0.5 | 17 | 59.04 | 86220 | 59443 | 1.45 |
| 34a | 75-25 | 1.9 | 0.5 | 1 | 9.24 | 33080 | 17273 | 1.92 |
| 34b | 75-25 | 1.9 | 0.5 | 10 | 35.98 | 57977 | 41237 | 1.41 |
| 34c | 75-25 | 1.9 | 0.5 | 17 | 53.90 | 70197 | 51103 | 1.37 |
| 35a | 75-25 | 1.3 | 2 | 1 | 16.28 | 45147 | 25412 | 1.78 |
| 35b | 75-25 | 1.3 | 2 | 10 | 45.01 | 78058 | 52454 | 1.49 |
| 35c | 75-25 | 1.3 | 2 | 17 | 61.63 | 91528 | 60430 | 1.51 |
| 36a | 75-25 | 1.9 | 2 | 1 | 12.61 | 44820 | 22009 | 2.04 |
| 36b | 75-25 | 1.9 | 2 | 10 | 40.51 | 61462 | 41282 | 1.49 |
| 36c | 75-25 | 1.9 | 2 | 17 | 56.86 | 75826 | 50472 | 1.50 |
| 37a | 75-25 | 1.3 | 5 | 1 | 18.78 | 56149 | 33899 | 1.66 |
| 37b | 75-25 | 1.3 | 5 | 10 | 52.43 | 85797 | 53513 | 1.60 |
| 37c | 75-25 | 1.3 | 5 | 17 | 63.21 | 96609 | 60447 | 1.60 |
| 38a | 75-25 | 1.9 | 5 | 1 | 16.37 | 53120 | 27028 | 1.97 |
| 38b | 75-25 | 1.9 | 5 | 10 | 47.74 | 70721 | 45572 | 1.55 |
| 38c | 75-25 | 1.9 | 5 | 17 | 65.39 | 84045 | 54312 | 1.55 |

TABLE IX

| Sampl Code | Monomer/Solvent Ratio | [NOx]/[$I_0$] | Maleic Anhydride Wt. % | Reaction Time (hr) | % Conversion | Mw | Mn | PD |
|---|---|---|---|---|---|---|---|---|
| 39a | 50-50 | 1.3 | 0.5 | 1 | 6.42 | 43379 | 25216 | 1.72 |
| 39b | 50-50 | 1.3 | 0.5 | 10 | 18.81 | 68026 | 45673 | 1.49 |
| 39c | 50-50 | 1.3 | 0.5 | 17 | 22.46 | 76149 | 50189 | 1.52 |
| 40a | 50-50 | 1.9 | 0.5 | 1 | 5.21 | 33695 | 18965 | 1.78 |
| 40b | 50-50 | 1.9 | 0.5 | 10 | 15.73 | 55391 | 38296 | 1.45 |
| 40c | 50-50 | 1.9 | 0.5 | 17 | 19.59 | 63334 | 45681 | 1.39 |

TABLE IX-continued

| Sampl Code | Monomer/Solvent Ratio | [NOx]/[I₀] | Maleic Anhydride Wt. % | Reaction Time (hr) | % Conversion | Mw | Mn | PD |
|---|---|---|---|---|---|---|---|---|
| 41a | 50-50 | 1.3 | 2 | 1 | 7.93 | 47953 | 28987 | 1.65 |
| 41b | 50-50 | 1.3 | 2 | 10 | 19.80 | 75655 | 49326 | 1.53 |
| 41c | 50-50 | 1.3 | 2 | 17 | 29.34 | 86952 | 56532 | 1.54 |
| 42a | 50-50 | 1.9 | 2 | 1 | 6.09 | 41426 | 22220 | 1.86 |
| 42b | 50-50 | 1.9 | 2 | 10 | 15.13 | 60103 | 41940 | 1.43 |
| 42c | 50-50 | 1.9 | 2 | 17 | 19.71 | 69336 | 46676 | 1.49 |
| 43a | 50-50 | 1.3 | 5 | 1 | 7.34 | 49712 | 28574 | 1.74 |
| 43b | 50-50 | 1.3 | 5 | 10 | 16.87 | 75502 | 49040 | 1.54 |
| 43c | 50-50 | 1.3 | 5 | 17 | 20.91 | 83957 | 52603 | 1.60 |
| 44a | 50-50 | 1.9 | 5 | 1 | 5.78 | 48935 | 25286 | 1.94 |
| 44b | 50-50 | 1.9 | 5 | 10 | 16.79 | 64223 | 41188 | 1.56 |
| 44c | 50-50 | 1.9 | 5 | 17 | 21.66 | 73072 | 47823 | 1.53 |
| 45a | 75-25 | 1.3 | 0.5 | 1 | 17.29 | 54402 | 32788 | 1.66 |
| 45b | 75-25 | 1.3 | 0.5 | 10 | 60.87 | 89973 | 61411 | 1.47 |
| 45c | 75-25 | 1.3 | 0.5 | 17 | 63.43 | 99887 | 64953 | 1.54 |
| 46a | 75-25 | 1.9 | 0.5 | 1 | 12.05 | 41971 | 21226 | 1.98 |
| 46b | 75-25 | 1.9 | 0.5 | 10 | 52.88 | 71904 | 50123 | 1.43 |
| 46c | 75-25 | 1.9 | 0.5 | 17 | 64.45 | 79942 | 56865 | 1.41 |
| 47a | 75-25 | 1.3 | 2 | 1 | 18.16 | 51266 | 29803 | 1.72 |
| 47b | 75-25 | 1.3 | 2 | 10 | 62.61 | 84629 | 54241 | 1.56 |
| 47c | 75-25 | 1.3 | 2 | 17 | 70.23 | 98998 | 60790 | 1.63 |
| 48a | 75-25 | 1.9 | 2 | 1 | 13.85 | 42934 | 23175 | 1.85 |
| 48b | 75-25 | 1.9 | 2 | 10 | 51.39 | 67031 | 45929 | 1.46 |
| 48c | 75-25 | 1.9 | 2 | 17 | 64.36 | 81069 | 54733 | 1.48 |
| 49a | 75-25 | 1.3 | 5 | 1 | 22.89 | 59292 | 27405 | 2.16 |
| 49b | 75-25 | 1.3 | 5 | 10 | 62.80 | 94182 | 47819 | 1.97 |
| 49c | 75-25 | 1.3 | 5 | 17 | 65.71 | 113273 | 51148 | 2.21 |
| 50a | 75-25 | 1.9 | 5 | 1 | 18.32 | 52756 | 25533 | 2.07 |
| 50b | 75-25 | 1.9 | 5 | 10 | 57.35 | 84899 | 38189 | 2.22 |
| 50c | 75-25 | 1.9 | 5 | 17 | 65.69 | 99526 | 40311 | 2.47 |

EXAMPLE VI

Copolymers of styrene (Aldrich, 99%) and maleic anhydride (Aldrich, 95%) were prepared by bulk polymerization at 120° C., in presence of a special stable free radical nitroxide (3,3-dimethyl-1,1-diphenyl azabutane-N-oxide, 99%) which was synthesized by the group of Prof. Martha Albores at the Facultad de Qumica (School of Chemistry) of the National Autonomous University of Mexico. BPO (Akzo, 75%) was used as initiator (0.0065 M). A 2×2 factorial with some replicates varying concentrations of maleic anhydride (2 levels) and nitroxide to initiator ([NOx]/[I.sub.0]) ratio (two levels) were run in a combinatorial parallel polymerization reactor (PPR Symyx™). Table X shows the results of conversion and molecular weight at different reaction times for the different experiments of the factorial. The samples were characterized by gravimetry for conversion and rapid GPC (Symyx, ELSD detector, THF eluent, 60° C., Plgel 10 .mu.m mixed-B columns).

TABLE X

| Sample Code | Maleic Anhydride Wt. % | [NOx]/[I₀] Ratio | Time of Reaction (h) | % Conversion | Mw | Mn | PD |
|---|---|---|---|---|---|---|---|
| 51a | 2 | 1.3 | 0.3333 | 24.16 | 14420 | 9738 | 1.48 |
| 51b | 2 | 1.3 | 1 | 34.38 | 17810 | 12170 | 1.46 |
| 51c | 2 | 1.3 | 3 | 53.92 | 22910 | 15760 | 1.45 |
| 51d | 2 | 1.3 | 5 | 63.85 | 28580 | 20030 | 1.43 |
| 51e | 2 | 1.3 | 7 | 94.66 | 33660 | 23090 | 1.46 |
| 52a | 2 | 1.3 | 0.3333 | 31.50 | 17920 | 12040 | 1.49 |
| 52b | 2 | 1.3 | 1 | 36.54 | 19000 | 12880 | 1.48 |
| 52c | 2 | 1.3 | 3 | 48.42 | 23180 | 15540 | 1.49 |
| 52d | 2 | 1.3 | 5 | 69.51 | 29710 | 20340 | 1.46 |
| 52e | 2 | 1.3 | 7 | 96.07 | 35460 | 23930 | 1.48 |
| 53a | 2 | 1.9 | 0.3333 | 20.05 | 15270 | 10170 | 1.50 |
| 53b | 2 | 1.9 | 1 | 30.74 | 16060 | 10840 | 1.48 |
| 53c | 2 | 1.9 | 3 | 53.88 | 22330 | 15640 | 1.43 |
| 53d | 2 | 1.9 | 5 | 56.09 | 25080 | 17210 | 1.46 |
| 56a | 5 | 1.3 | 0.3333 | 30.04 | 22270 | 14510 | 1.53 |
| 56b | 5 | 1.3 | 1 | 51.29 | 26530 | 17650 | 1.50 |
| 56c | 5 | 1.3 | 3 | 62.33 | 33200 | 21000 | 1.58 |
| 56d | 5 | 1.3 | 5 | 17.18 | 41720 | 26510 | 1.57 |
| 56e | 5 | 1.3 | 7 | 37.45 | 51680 | 31870 | 1.62 |
| 55a | 5 | 1.3 | 0.3333 | 32.35 | 25240 | 16370 | 1.54 |
| 55b | 5 | 1.3 | 1 | 48.89 | 36670 | 23480 | 1.56 |
| 55c | 5 | 1.3 | 3 | 60.23 | 47350 | 31480 | 1.50 |
| 55d | 5 | 1.3 | 5 | 86.50 | 65790 | 42010 | 1.57 |
| 55e | 5 | 1.3 | 7 | 96.59 | 68360 | 43480 | 1.57 |
| 56a | 5 | 1.9 | 0.3333 | 29.42 | 24920 | 16260 | 1.53 |

TABLE X-continued

| Sample Code | Maleic Anhydride Wt. % | [NOx]/[I₀] Ratio | Time of Reaction (h) | % Conversion | Mw | Mn | PD |
|---|---|---|---|---|---|---|---|
| 56b | 5 | 1.9 | 1 | 40.27 | 29120 | 18960 | 1.54 |
| 56c | 5 | 1.9 | 3 | 73.14 | 42970 | 27950 | 1.54 |
| 56d | 5 | 1.9 | 5 | 82.14 | 46000 | 30340 | 1.52 |
| 56e | 5 | 1.9 | 7 | 93.81 | 92080 | 45660 | 2.02 |

EXAMPLE VII

Styrene (Aldrich, 99%) with 5% maleic anhydride (Aldrich, 99%) were copolymerized with benzoyl peroxide (BPO, Akzo purified to 99%), 0.005M, as initiator and 6 hydroxi, 2,2,6,6 tetramethyl-piperidine-N-oxyl (HO-TEMPO, 99%, Ciba, Puebla, Mexico) as stable free radical. The molar ratio of HO-TEMPO to BPO was 2.5. Polymerization was carried out in a Parallel Polymerization Reactor (PPR Symyx™). The reaction was carried out at 120° C. Monomer conversion was determined at different times by gravimetry. The molecular weight of the polymer was measured by GPC (Waters model 610, R1 detector, THF eluent, 1 ml/min, at 60° C., Styragel columns, linear, HR5, HR6, HR3). Results are shown in Table XI. Polydispersities below 2 are obtained at a ratio of HO-TEMPO to BPO of 2.5.

TABLE XI

| Sample Name | Maleic Anhydride (%) | Time (min) | Conversion (%) | Mn | Mw | PD |
|---|---|---|---|---|---|---|
| 57a | 5 | 30 | 23.86 | 21591 | 34082 | 1.58 |
| 57b | 5 | 60 | 34.02 | 30007 | 50086 | 1.67 |
| 57c | 5 | 120 | 45.47 | 32140 | 55394 | 1.72 |
| 57d | 5 | 300 | 42.83 | 40145 | 77219 | 1.92 |

The bisphenol-A (BPA) polycarbonate which was utilized in the following examples was Lexan 141 obtained from General Electric Plastics. The polyethylene terephthalate (PET) was a recycled resin with characteristics equivalent to grade 1101 from KOSA. The high impact polystyrene (HIPS) was HIPS 4220, a medium impact, medium flow grade (notched Izod impact=1.3 ft-lb/in, MFI "G"=8.0 g/10 min.) obtained from Resirene. The polyamide (PA-6) was a commercial polyamide-6 ZYTEL 7300 NC010 available from DuPont. The two grades of polyphenylene ether, PPE (Blendex HPP820 and HPP830) which were utilized in the following examples were obtained from General Electric Specialty Chemicals and had an intrinsic viscosity in chloroform at 25° of 0.40 dl./g. Blendex HPP830 is a blend of polyphenylene ether and polystyrene. The impact modifier was a hydrogenated linear triblock copolymer (SEBS) Calprene CH 6110 from Dynasol containing 30% styrene and having a Brookfield viscosity (20 wt % solids in toluene) of 400 cps. The polystyrene (PS) was HH 104, a medium flow grade (MFI "G"=4.2 g/10 min.) obtained from Resirene. The glass fiber was type E chopped in strands of 5 mm in length containing an amine sizing.

Styrene-UCA block copolymers used in the following examples correspond to samples 17, 18, 19, 20, 22, 23 synthesized in Example III.

All blends were prepared by dry mixing the components followed by extrusion on a WP ZSK 30 mm. co-rotating, fully intermeshing, twin-screw extruder at 150 rpm. The barrel segment temperatures were dependant on the system to evaluate, in the case of the polycarbonate and polyester blends the profile was 260° C. (throat), 270° C., 270° C., 275° C. For the PA6 blends the profile was 220° C. (throat), 230° C., 230° C., 240° C. For the polystyrene glass fiber compositions the profile was 160° C. (throat), 180° C., 190° C., 195° C. The extrudate was quenched in water, pelletized, and dried in a circulating air oven at 100-110° C. before molding into test specimens using a Demag Ergotech 80/420 injection molder at barrel set temperatures of 275° C. for polycarbonate and polyester blend, 240° C. for polyamide 6 blends, and 210° C. for polystyrene-glass fiber compositions. The mold temperature was 50° C. in all cases. Izod impact values were determined as per ASTM #D256. Tensile properties were determined as per ASTM #D638. Flexural properties were determine as per ASTM #D790. Heat Deflection Temperature (HDT) was determined as per ASTM #D648.

TABLE XII

| | Sample | | | | | | | |
|---|---|---|---|---|---|---|---|---|
| | Composition (parts by weight) | | | | | | | |
| | 58 | 59 | 60 | 61 | 62 | 63 | 64 | 65 |
| Polycarbonate | 70 | 70 | 70 | — | — | — | — | — |
| Polyethylene Terephtalate (PET) | — | — | — | 70 | 70 | 70 | — | — |
| Polyamide 6 | — | — | — | — | — | — | 70 | 70 |
| HIPS | 30 | 27 | 25 | 30 | 25 | 27 | 30 | 30 |
| SMA sample 18-Examole III | — | 3 | 5 | — | — | 3 | — | — |
| SMA sample 19-Examole III | — | — | — | — | 5 | — | — | 5 |
| Properties | — | — | — | — | — | — | — | — |
| Yield Strength (psi) | 7250 | 7560 | 7640 | 6300 | 6470 | 6500 | 7189 | 7540 |
| Elongation at Break (%) | 82.3 | 93.1 | 85.8 | 10.4 | 12.9 | 17 | 14 | 22 |

Samples 59-60 and Comparison Sample 58 show that there is an improvement in the yield strength and elongation at break for blends containing the SMA copolymer, this improvement seemed to vary with the amount of SMA in the polycarbonate/HIPS blends. Samples 62-63 and Comparison Sample 61 show a similar trend blends of PET and HIPS. In this case the degree of improvement is also correlated with the type of SMA used in the blend. Sample 65 also shows improvements in the same properties with respect to Comparative Sample 64 for blends of PA6 and HIPS.

TABLE XIII

| | Sample | | | | |
|---|---|---|---|---|---|
| | Composition (parts by weight) | | | | |
| | 66 | 67 | 68 | 69 | 70 |
| PPE HPP820 | 50 | 50 | | | |
| PPE HPP830 | | | 50 | 50 | 50 |
| Polyamide 6 | 50 | 50 | 50 | 50 | 50 |
| SEBS | | | 10 | 10 | 10 |
| SMA sample 17 Example III | | 3 | | | |
| SMA sample 20 Example III | | | | 5 | |
| SMA sample 23 Example III | | | | | 5 |
| Properties | | | | | |
| Notched Izod Impact (ft-lb/in) | 0.3 | 0.3 | 0.9 | 1.2 | 1.1 |
| Izod Impact without notch (ft-lb/in) | 4.6 | 5.7 | 26.3 | NB* | NB* |
| Tensile Strength (psi) | 7250 | 5570 | 6730 | 8130 | 8640 |
| Elongation at Break (%) | 8.5 | 6.1 | 11 | 70 | 62 |
| Flexural Strength (psi) | 10330 | 11360 | 11.04 | 11.84 | 12.24 |
| Flexural Modulus (Kpsi) | 278 | 293 | 221 | 217 | 233 |

*indicates that the specimens did not break during the test

Sample 67 and Comparison Sample 66 show that there is an improvement in the flexural strength, flexural modulus and unnotched impact strength for PPE and HIPS blends containing the SMA copolymer, this improvement is also seen in the unnotched impact properties. Samples 69-70 and Comparison Sample 68 show a similar trend blends of PPE and HIPS containing the impact modifier (SEBS). In this case the improvement in properties can be observed across all properties but it is extremely evident in the elongation at break. The improvement in properties is also dependant on the type of SMA used in the blend.

Figure 4A:
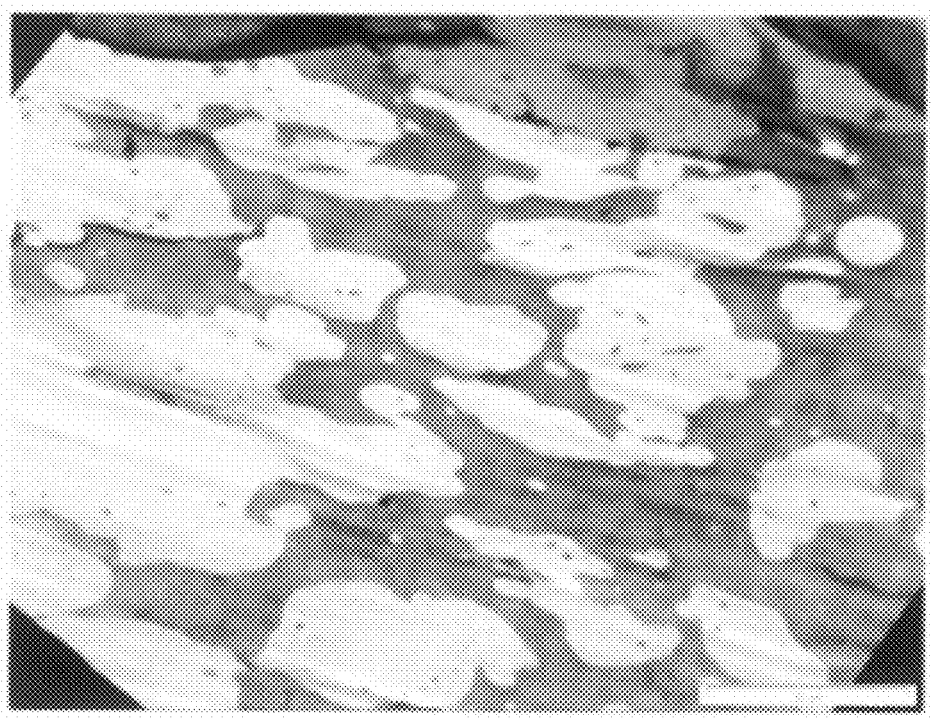
FIG. 4A is a transmission electron photomicrograph of a blend of polyphenylene ether, triblock copolymer SEBS and polyamide 6. The polyamide is stained in dark using phosphotugnstic acid.
Figure 4B:
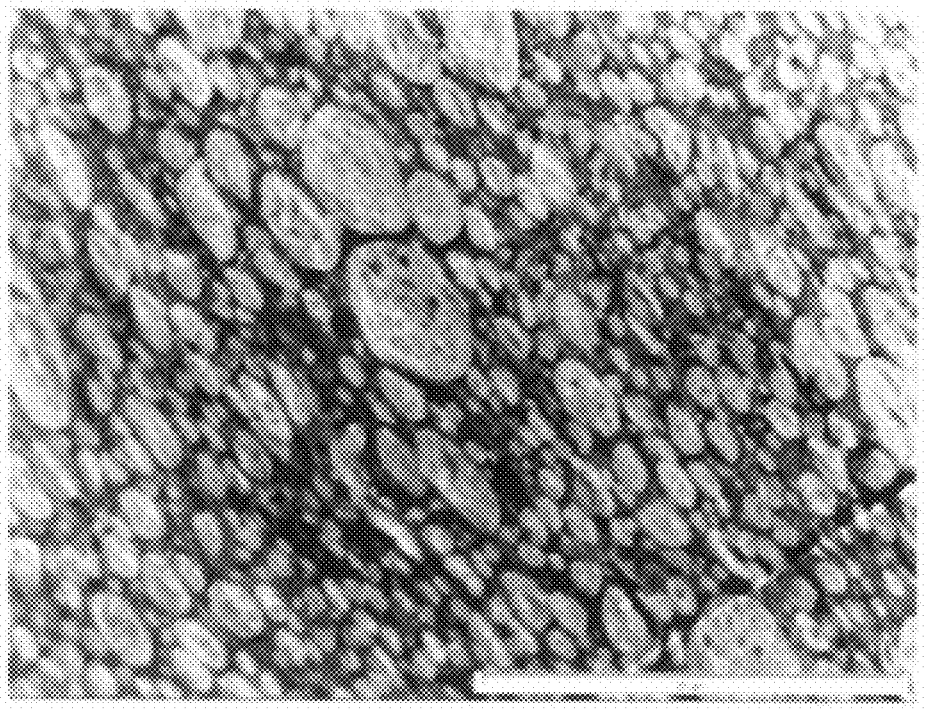
FIG. 4B is a transmission electron photomicrograph of a blend of polyphenylene ether, triblock copolymer SEBS and polyamide 6 compatibilized with the block copolymer of styrene and maleic anhydride synthetized in example III (sample 18). The polyamide is stained in dark using phosphotugnstic acid.

Further evidence of the compatibilization effect of the SMA block copolymer in these blends can be appreciated in FIGS. 4a and 4b. In these figures a non compatibilized blend of PPE, SEBS and PA (50/10/50) (FIG. 4A) is compared to a blend containing the SMA block copolymer (FIG. 4B). The drastic change in morphology provides an indication of the increase in interfacial adhesion, reduction of interfacial tension and morphology stabilization obtained by the use of the compatibilizer, this change in morphology is in turn correlated with the improvements in mechanical properties shown in Table XIII.

TABLE XIV

| | Sample | | | |
|---|---|---|---|---|
| | Composition (parts by weight) | | | |
| | 71 | 72 | 73 | 74 |
| Polystyrene HH104 | 90 | 87 | 87 | 85 |
| Fiber Glass | 10 | 10 | 10 | 10 |
| SAM sample 20 Example III | | 3 | | |
| SAM sample 22 Example III | | | 3 | |
| SAM sample 23 Example III | | | | 5 |
| Properties | | | | |
| Flexural Yield Strength (psi) ASTM D790 | 13080 | 15080 | 15080 | 14880 |
| Flexural Modulus (kpsi) | 439 | 533 | 522 | 526 |
| Tensile Strength (psi) ASTM D638 | 7830 | 9260 | 9220 | 9300 |
| Deflection Temperature at 1.8 Mpa (C.) | 87.6 | 90.2 | 90.1 | 96 |

Samples 72-75 and Comparison Sample 71 show that there is a considerable improvement in the flexural strength, flexural modulus, tensile strength and heat deflection temperature for polystyrene and glass fiber compositions containing the SMA block copolymer. The improvement in properties seems to be independent of the type of SMA block copolymer used in the composition.

The foregoing disclosure and description of the preferred and various embodiments of the invention is illustrative only. Some alternatives for the various features have been expressly disclosed, but other variations and alternatives can be used. Various changes may be made to yield equivalent embodiments. The scope of the invention should be determined by the following claims and not by the specific embodiments used to illustrate the invention.

What is claimed is:

1. A thermoplastic polymer composition, comprising:
   (i) 1-20 wt % of a block copolymer comprising first and second blocks, wherein the first block comprises a copolymer of styrene and an unsaturated cyclic anhydride (UCA) and the second block comprises polystyrene, and wherein the block copolymer has no more than about 18 wt % UCA, a polydispersity between about 1.2 and about 3 and a number average molecular weight greater than about 25,000;
   (ii) 1-98 wt % engineering thermoplastic having functional groups capable of reacting with or compatible with the first block of the block copolymer; and
   (iii) 1-98 wt % thermoplastic polymer with polymer segments compatible or miscible with the second block of the block copolymer.

2. The thermoplastic polymer composition of claim 1, wherein the block copolymer is made by the process comprising the steps of:
   (a) making a first block by reacting styrene monomer, an unsaturated cyclic anhydride (UCA) monomer, a free radical initiator and a stable free radical;
   (b) making a second block by continuing the reaction in step (a) after the UCA monomer is essentially depleted; and (c) recovering a block copolymer consisting essentially of the first and second blocks, wherein the block copolymer has a number average molecular weight greater than about 25,000.

3. The thermoplastic polymer composition of claim 2, wherein the number average molecular weight of the block copolymer is less than about 200,000.

4. The thermoplastic polymer composition of claim 3, wherein UCA in the block copolymer is maleic anhydride, and wherein the block copolymer comprises between about 0.1 and about 8 weight percent maleic anhydride.

5. The thermoplastic polymer composition of claim 4, wherein the engineering thermoplastic is selected from the group consisting of aliphatic or aromatic polycarbonates, polyesters, polyamides, polyphenylene ether, and mixtures thereof.

6. The thermoplastic polymer composition of claim 5, wherein the thermoplastic polymer is high-impact polystyrene, a block copolymer of styrene and butadiene, or a styrene-methyl methacrylate copolymer.

7. The thermoplastic polymer composition of claim 1, wherein the engineering thermoplastic is a polyamide and the thermoplastic polymer is a high-impact polystyrene and/or a styrene-butadiene block copolymer and/or polyphenylene ether and/or a mixture of polyphenylene ether and polystyrene.

8. The thermoplastic polymer composition of claim 1, wherein the thermoplastic polymer is polystyrene and/or a high-impact polystyrene and/or a styrene-butadiene block copolymer and the engineering thermoplastic is
   a) an aromatic polycarbonate;
   b) a polyethylene terephthalate; or
   c) a polybutylene terephthalate.

9. The thermoplastic polymer composition of claim 1, wherein the engineering thermoplastic has a functional group selected from the group consisting of amino (NH2), amide (NH), carboxyl (COOH) and hydroxyl (OH).

10. The thermoplastic polymer composition of claim 9, wherein the UCA is maleic anhydride.

11. The thermoplastic polymer composition of claim 10, wherein the thermoplastic polymer is high-impact polystyrene, a block copolymer of styrene and butadiene, or a styrene-methyl methacrylate copolymer.

* * * * *